(12) United States Patent
Chou et al.

(10) Patent No.: US 8,908,292 B2
(45) Date of Patent: Dec. 9, 2014

(54) FIXED FOCAL LENGTH LENS

(71) Applicants: Yu-Hung Chou, Hsinchu (TW);
Ying-Hsiu Lin, Hsinchu (TW);
Yuan-Hung Su, Hsinchu (TW);
Shiu-Sheng Li, Hsinchu (TW)

(72) Inventors: Yu-Hung Chou, Hsinchu (TW);
Ying-Hsiu Lin, Hsinchu (TW);
Yuan-Hung Su, Hsinchu (TW);
Shiu-Sheng Li, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 10 days.

(21) Appl. No.: 13/744,357

(22) Filed: Jan. 17, 2013

(65) Prior Publication Data

US 2014/0029119 A1    Jan. 30, 2014

(30) Foreign Application Priority Data

Jul. 27, 2012  (TW) .............................. 101127292 A

(51) Int. Cl.
*G02B 13/18* (2006.01)
*G02B 13/16* (2006.01)
*G03B 27/32* (2006.01)

(52) U.S. Cl.
CPC ............... *G02B 13/18* (2013.01); *G02B 13/16* (2013.01); *G03B 27/32* (2013.01)
USPC .......................................... 359/717; 359/793

(58) Field of Classification Search
CPC ........ G02B 13/04; G02B 13/16; G02B 13/18; G02B 9/10
USPC .......................... 359/749, 750, 751, 752, 753
See application file for complete search history.

(56) References Cited

U.S. PATENT DOCUMENTS

| | | | |
|---|---|---|---|
| 6,542,316 B2 | 4/2003 | Yoneyama |
| 6,560,041 B2 | 5/2003 | Ikeda et al. |
| 6,621,645 B2 | 9/2003 | Sato |
| 6,999,247 B2 | 2/2006 | Kim |
| 7,123,426 B2 | 10/2006 | Lu et al. |
| 7,126,767 B2 | 10/2006 | Lu |
| 7,173,777 B1 | 2/2007 | Lu et al. |
| 7,184,219 B2 | 2/2007 | Kobayashi |
| 7,423,819 B1 | 9/2008 | Chuang et al. |
| 7,859,770 B2 | 12/2010 | Su et al. |
| 7,952,817 B2 | 5/2011 | Kang et al. |

FOREIGN PATENT DOCUMENTS

TW        I247915       1/2006

*Primary Examiner* — David N Spector
(74) *Attorney, Agent, or Firm* — Jianq Chyun IP Office

(57) ABSTRACT

A fixed focal length lens includes a first lens group and a second lens group. The first lens group is disposed between a magnified side and a minified side and has a negative refractive power. The second lens group is disposed between the first lens group and the minified side and has a positive refractive power. The fixed focal length lens satisfies F/H>0.52, where F is an effective focal length of the fixed focal length, and H is an image height.

21 Claims, 10 Drawing Sheets

FIXED FOCAL LENGTH LENS

CROSS-REFERENCE TO RELATED APPLICATION

This application claims the priority benefit of Taiwan application serial no. 101127292, filed on Jul. 27, 2012. The entirety of the above-mentioned patent application is hereby incorporated by reference herein and made a part of this specification.

BACKGROUND OF THE INVENTION

1. Field of Invention

The invention generally relates to a projection lens, and more particularly, to a fixed focal length lens.

2. Background of the Invention

In general, a long projection distance is required if a projector needs to project an image onto a large screen. Contrarily, a special wide-angle lens is required to shorten the distance from the screen to the projector if the image is to be projected onto the large screen from a short projection distance. That is, the wide-angle lens may effectively reduce the distance from the screen to the projector and project a relatively large image. However, the aberration issue derived from the wide-angle lens is one of the obstacles faced by designers.

There are a number of solutions to the aberration issue, e.g., through the use of plural aspheric lenses, the increase in the total length of the lens, the use of a number of lenses, and so on. For instance, in U.S. Pat. No. 6,621,645, at least one molded glass is applied, thus increasing the costs. Besides, the distortion value disclosed in said patent is greater than ±1%. In U.S. Pat. No. 6,560,041, at least three aspheric lenses are employed, which raises the manufacturing costs and the assembly difficulty. If only a few aspheric lenses are to be used, and it is intended to effectively correct the aberration, the total length of the lenses may be increased, and the volume of the projection system may be enlarged. For instance, in U.S. Pat. Nos. 6,999,247 and 6,542,316, the total length of the lenses is greater than 150 mm. It is also likely to correct the aberration by utilizing a large number of lenses. For instance, in U.S. Pat. Nos. 6,621,645 and 7,184,219, at least 14 lenses are applied in the projection lens for aberration correction. Besides, in Taiwan patent no. 1247915 and U.S. Pat. No. 7,952,817, at least 13 lenses are applied in the projection lens for aberration correction.

In U.S. Pat. No. 7,423,819, the fixed-focus lens includes a first lens group, a second lens group, and a third lens group that are sequentially arranged from an object side to an image side, and the third lens group includes triple cemented lenses. U.S. Pat. No. 7,859,770 satisfies the following: if F/H>0.627, the wide-angle effect may be achieved, and the aberration reaches the minimum value and satisfies $0.5<|F1/F|<1.7$ and $1.9<|F2/F|<3.1$, where F refers to a focal length of the lens, F1 refers to a focal length of the first lens group, and F2 refers to a focal length of the second lens group. Lens-related technologies have also been disclosed in numerous patents, such as U.S. Pat. Nos. 7,126,767, 7,123,426, and 7,173,777.

In view of the above, how to design a lens with low manufacturing costs and favorable imaging quality has become one of the research topics to people having ordinary skill in the pertinent field.

SUMMARY OF THE INVENTION

The invention is directed a fixed focal length lens having low costs and favorable optical characteristics.

Other aspects and advantages of the invention are set forth in the description of the techniques disclosed in the invention.

To achieve one of, a part of or all of the above-mentioned advantages, or to achieve other advantages, an embodiment of the invention provides a fixed focal length lens that includes a first lens group and a second lens group. The first lens group is disposed between a magnified side and a minified side and has a negative refractive power. The second lens group is disposed between the first lens group and the minified side and has a positive refractive power. The fixed focal length lens satisfies F/H>0.52, where F is an effective focal length of the fixed focal length lens, and H is an image height.

The embodiment of the invention has at least one of the following advantages or functions. The fixed focal length lens described in the embodiment of the invention includes two lens groups, which may effectively resolve the aberration issue, reduce the volume of the projection system, simplify the fabrication and assembly of the lens, and significantly lower down the overall costs on optical devices and the costs on the lens mechanism.

Other features and advantages of the invention will be further understood from the further technological features disclosed by the embodiments of the invention wherein there are shown and described embodiments of this invention, simply by way of illustration of modes suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EXEMPLARY EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1:
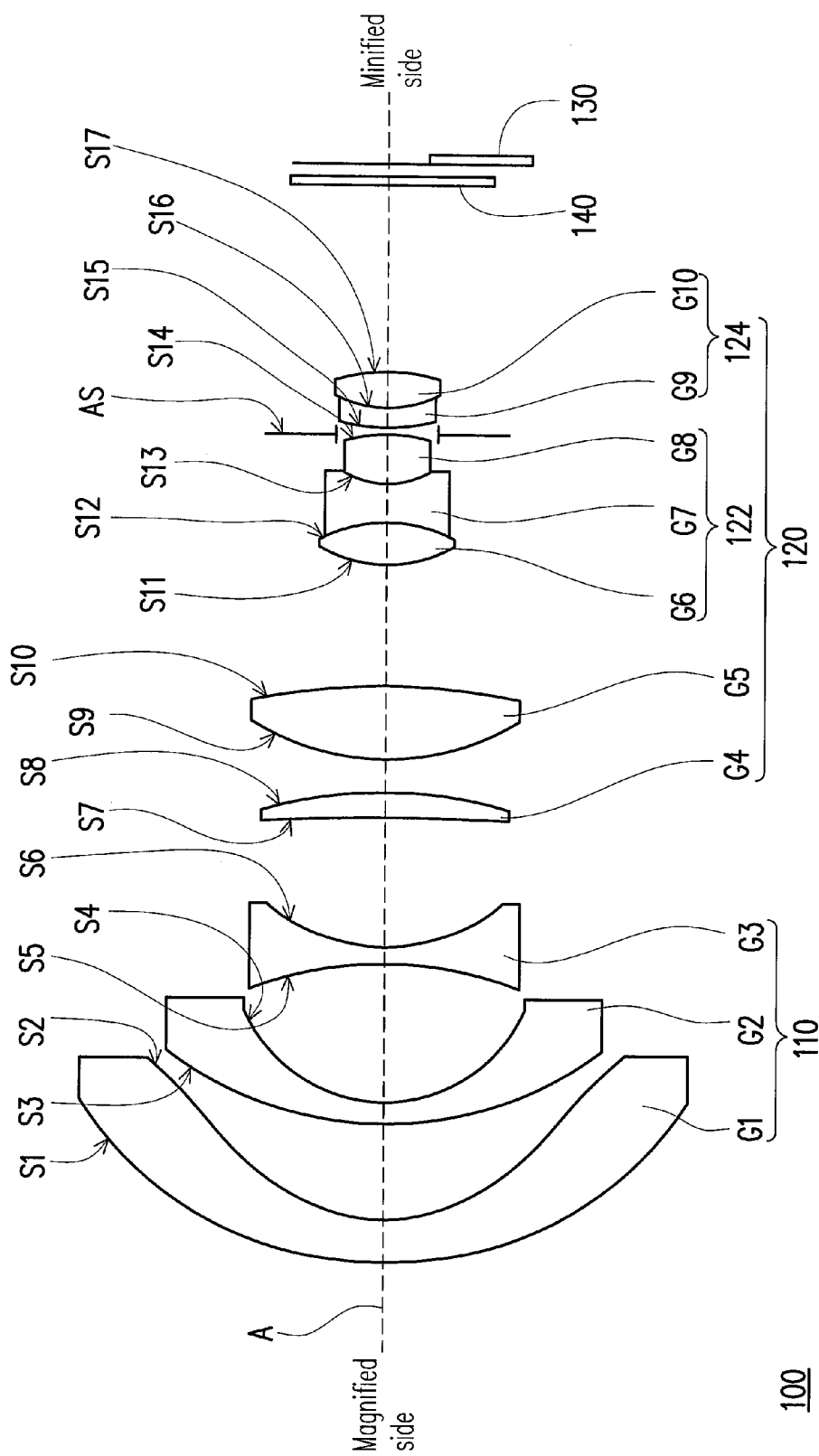
FIG. 1 is a schematic view illustrating a structure of a fixed focal length lens according to a first embodiment of the invention.

FIG. 1 is a schematic view illustrating a structure of a fixed focal length lens according to a first embodiment of the invention. With reference to FIG. 1, the fixed focal length lens 100 is suitable for being disposed between a magnified side and a minified side, and the fixed focal length lens 100 has an optical axis A and includes a first lens group 110 and a second lens group 120.

The first lens group 110 has a negative refractive power and includes a first lens G1, a second lens G2, and a third lens G3 sequentially arranged from the magnified side to the minified side. A refractive power of the first lens G1, a refractive power of the second lens G2, and a refractive power of the third lens G3 are sequentially negative, negative, and negative. The second lens group 120 is disposed between the first lens group 110 and the minified side and has a positive refractive power. Besides, the second lens group 120 includes a fourth lens G4, a fifth lens G5, a sixth lens G6, a seventh lens G7, an eighth lens G8, a ninth lens G9, and a tenth lens G10 sequentially arranged from the magnified side to the minified side. A refractive power of the fourth lens G4, a refractive power of the fifth lens G5, a refractive power of the sixth lens G6, a refractive power of the seventh lens G7, a refractive power of the eighth lens G8, a refractive power of the ninth lens G9, and a refractive power of the tenth lens G10 are sequentially positive, positive, positive, negative, positive, negative, and positive from the magnified side to the minified side.

In the embodiment, the position of the second lens group 120 in the fixed focal length lens 100 is fixed, and the first lens group 110 moves relative to the second lens group 120 to focus. Namely, the first lens group 110 is a focusing lens group suitable for conducting a focus-adjusting compensation at different projection distances.

Generally, an image processing device 130 may be disposed on the minified side. In the embodiment, the image processing device 130 is, for instance, a light valve, and the light valve may be a digital micro-mirror device (DMD), a liquid-crystal-on-silicon panel (LCOS panel), or a transmissive liquid crystal panel (transmissive LCD), for instance. Besides, in the embodiment, the fixed focal length lens 100 is used to form an image provided by the image processing device 130 at the magnified side.

In addition, as shown in FIG. 1, the fixed focal length lens 100 described in the embodiment further includes an aperture stop AS disposed between the eighth lens G8 and the ninth lens G9. A glass cover 140 is further disposed between the image processing device 130 and the tenth lens G10 to protect the image processing device 130.

To ensure the optical imaging quality, the fixed focal length lens 100 in the embodiment may satisfy $0.515<|f_1/f|<1.299$ and $2.313<|f_2/f|<5.724$. Here, f refers to an effective focal length (EFL) of the fixed focal length lens 100, $f_1$ refers to an EFL of the first lens group 110, and $f_2$ refers to an EFL of the second lens group 120.

An embodiment of the fixed focal length lens 100 is given hereinafter. However, the invention is not limited to the data listed in Table 1. People having ordinary skill in the art may be able to properly modify the parameters or the configuration of the invention in view of the invention without departing from the scope or spirit of the invention.

TABLE 1

| Surface | Curvature Radius(mm) | Interval (mm) | Refraction Index | Abbe Number | Notes |
|---|---|---|---|---|---|
| S1 | 53.88 | 4.60 | 1.49 | 57.4 | First lens |
| S2 | 20.86 | 11.26 | | | |
| S3 | 44.82 | 2.40 | 1.74 | 44.8 | Second lens |
| S4 | 18.15 | 16.28 | | | |
| S5 | −42.96 | 2.00 | 1.74 | 44.8 | Third lens |
| S6 | 22.75 | Variable | | | |
| S7 | −262.48 | 3.08 | 1.78 | 25.7 | Fourth lens |
| S8 | −51.60 | 3.72 | | | |
| S9 | 32.08 | 8.38 | 1.60 | 38.0 | Fifth lens |
| S10 | −70.77 | 14.20 | | | |
| S11 | 17.81 | 4.70 | 1.52 | 64.1 | Sixth lens |
| S12 | −20.08 | 4.59 | 1.83 | 37.2 | Seventh lens |
| S13 | 11.00 | 5.70 | 1.58 | 40.7 | Eighth lens |
| S14 | −35.81 | 1.20 | | | Aperture stop |
| S15 | 41.25 | 2.39 | 1.85 | 23.8 | Ninth lens |
| S16 | 19.36 | 3.90 | 1.50 | 81.5 | Tenth lens |
| S17 | −19.88 | 21.50 | | | |

In Table 1, the interval refers to a linear distance between two adjacent surfaces on the optical axis A. For instance, the interval of the surface S1 refers to the linear distance between the surface S1 and the surface S2 on the optical axis A. The thickness, the refraction index, and the abbe number corresponding to each of the lenses listed in the "Notes" columns may be referred to as the corresponding values of the interval, the refraction index, and the abbe number listed in the corresponding rows. In the embodiment, the position of the second lens group 120 in the fixed focal length lens 100 remains unchanged, and the first lens group 110 moves relative to the second lens group 120 to focus. Therefore, the interval of the surface S6 is marked as "variable", which indicates the linear distance between the surface S6 and the surface S7 is variable on the optical axis A. According to an embodiment, when a projection distance is relatively short, the interval of the surface S6 is 8.83 mm, for instance; according to another embodiment, when a projection distance is relatively long, the interval of the surface S6 is 8.76 mm, for instance.

Moreover, in Table 1, the surfaces S1 and S2 are two surfaces of the first lens G1, the surfaces S3 and S4 are two surfaces of the second lens G2, the surfaces S5 and S6 are two surfaces of the third lens G3, the surfaces S7 and S8 are two surfaces of the fourth lens G4, the surfaces S9 and S10 are two surfaces of the fifth lens G5, the surface S11 is a surface of the sixth lens G6 facing the magnified side, the surface S12 is a surface where the sixth lens G6 is connected to the seventh lens G7, the surface S13 is a surface where the seventh lens G7 is connected to the eighth lens G8, and the surface S14 is a surface of the eight lens G8 facing the minified side. Here, the surface S14 is also the place where the aperture stop AS is located. The surface S15 is a surface of the ninth lens G9 facing the magnified side, the surface S16 is a surface where the ninth lens G9 is connected to the tenth lens G10, and the surface S17 is surface of the tenth lens G10 facing the minified side. The curvature radius, the interval, and other parameters of each surface are shown in Table 1 and will not be further described hereinafter.

The surfaces S1 and S2 of the first lens G1 are aspheric surfaces and may be represented by the following formula:

$$Z = \frac{cy^2}{1 + \sqrt{1 - (1+K)c^2 y^2}} + A_1 y^1 + A_2 y^2 + A_3 y^3 + A_4 y^4 + A_5 y^5 + A_6 y^6 + A_7 y^7 + A_8 y^8 + A_9 y^9 + A_{10} y^{10} + A_{11} y^{11} + A_{12} y^{12} + A_{13} y^{13} + A_{14} y^{14}$$

In the formula, Z is a sag in the direction of the optical axis A, and c is the inverse of the radius of an osculating sphere, i.e. the inverse of the curvature radii (e.g., the curvature radii of the surfaces S1 and S2 in Table 1) close to the optical axis A. K is a conic coefficient, y is an aspheric height, and $A_1$ to $A_{14}$ are aspheric coefficients. The parameter values of the surfaces S1 and S2 are listed in Table 2.

TABLE 2

| | Aspheric Parameter | | | | |
|---|---|---|---|---|---|
| | Conic Coefficient K | Coefficient $A_1$ | Coefficient $A_2$ | Coefficient $A_3$ | Coefficient $A_4$ |
| S1 | 9.46E-01 | -9.37E-03 | 3.30E-03 | -5.00E-04 | 2.49E-05 |
| S2 | -6.27E-01 | -4.93E-03 | 4.61E-03 | -3.96E-04 | 1.60E-05 |

| | AsphericParameter | | | | |
|---|---|---|---|---|---|
| | Coefficient $A_5$ | Coefficient $A_6$ | Coefficient $A_7$ | Coefficient $A_8$ | Coefficient $A_9$ |
| S1 | 3.14E-08 | -2.58E-08 | -3.97E-11 | 2.63E-11 | -1.17E-14 |
| S2 | 2.39E-07 | -1.53E-08 | 1.32E-10 | -2.98E-11 | -1.53E-13 |

| | Aspheric Parameter | | | | |
|---|---|---|---|---|---|
| | Coefficient $A_{10}$ | Coefficient $A_{11}$ | Coefficient $A_{12}$ | Coefficient $A_{13}$ | Coefficient $A_{14}$ |
| S1 | -1.69E-14 | 1.44E-17 | 6.21E-18 | 2.90E-21 | -1.11E-21 |
| S2 | -5.64E-15 | -1.34E-16 | 5.10E-17 | 7.36E-20 | -2.69E-20 |

According to the present embodiment, it may be learned that the first lens G1 is an aspheric lens and thus the first lens G1 may effectively resolve coma issues, astigmatism issues, or distortion issues of the fixed focal length lens 100. Besides, in the embodiment, the optimal range of the effective focal length (EFL) of the fixed focal length lens 100 is 7.84 mm to 8.3 mm, which should however not be construed as a limitation to the invention. Besides, the numerical aperture (F/#) ranges from 2.71 to 2.91, and the viewing angle (2ω) is greater than 116.6°.

Moreover, the fixed-focus lens 100 described herein satisfies F/H>0.52, where F is an EFL of the fixed focal length lens 100, and H is an image height. If F/H>1, the viewing angle (2ω) of the fixed focal length lens 100 is less than 90°. At this time, the projection angle is not considered as a wide angle, and thus the imaging quality is not negatively affected even though the first lens G1 described herein is not an aspheric lens. However, if F/H<0.52, the viewing angle (2ω) of the fixed focal length lens 100 is greater than 140°; therefore, more aspheric lenses and other lenses are required to compensate the aberration.

Figure 2:
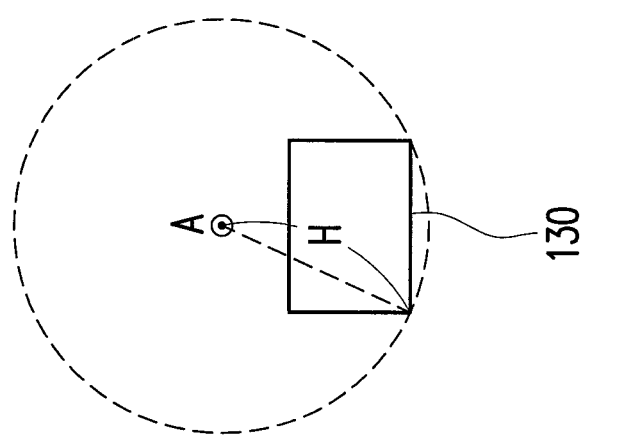
FIG. 2 is a schematic view briefly illustrating an image processing device disposed on a minified side according to an embodiment of the invention.

FIG. 2 is a schematic view briefly illustrating an image processing device disposed on a minified side according to an embodiment of the invention. The viewing angle is defined by watching from the magnified side to the minified side of the fixed focal length lens 100. The imaging process device 130 described in the embodiment is a light valve, and the light valve may be a DMD, for instance. The distance between the optical axis A of the fixed focal length lens 100 and the lower-left end point of the image processing device 130 may be defined as the image height H described herein. A circumscribed circle with the optical axis A as the circle center and the image height H as the radius may be made, and the circumscribed circle passes through the two lower end points of the image processing device 130.

With reference to FIG. 1, in the first lens group 110 described in the embodiment, each of the first lens G1 and the second lens G2 is a convex-concave lens with a convex surface facing the magnified side, and the third lens G3 is a biconcave lens. Each of the second lens G2 and the third lens G3 is a spherical lens, for instance. Due to the compensation resulting from the aspheric lens in the first lens group 110, at least the distortion issue may be effectively resolved.

According to the embodiment, in the second lens group 120, the fourth lens G4 is a concave-convex lens with a convex surface facing the minified side, each of the fifth lens G5, the sixth lens G6, the eighth lens G8, and the tenth lens G10 is a biconvex lens, the seventh lens G7 is a biconcave lens, and the ninth lens G9 is a convex-concave lens with a convex surface facing the magnified side. In the second lens group 120, the sixth lens G6, the seventh lens G7, and the eighth lens G8 together form a triple cemented lens 122, and the ninth lens G9 and the tenth lens G10 together form a double cemented lens 124. Thereby, the spherical aberration issue, the field curvature issue, and the color aberration issue of the fixed focal length lens 100 may be effectively resolved. Moreover, the lenses in the second lens group 120 are all spherical lenses, for instance. Since the tenth lens G10 is the biconvex lens, the light at the minified side may be effectively collected, and the collected light may pass through the lenses and be projected on the magnified side.

Figure 3:
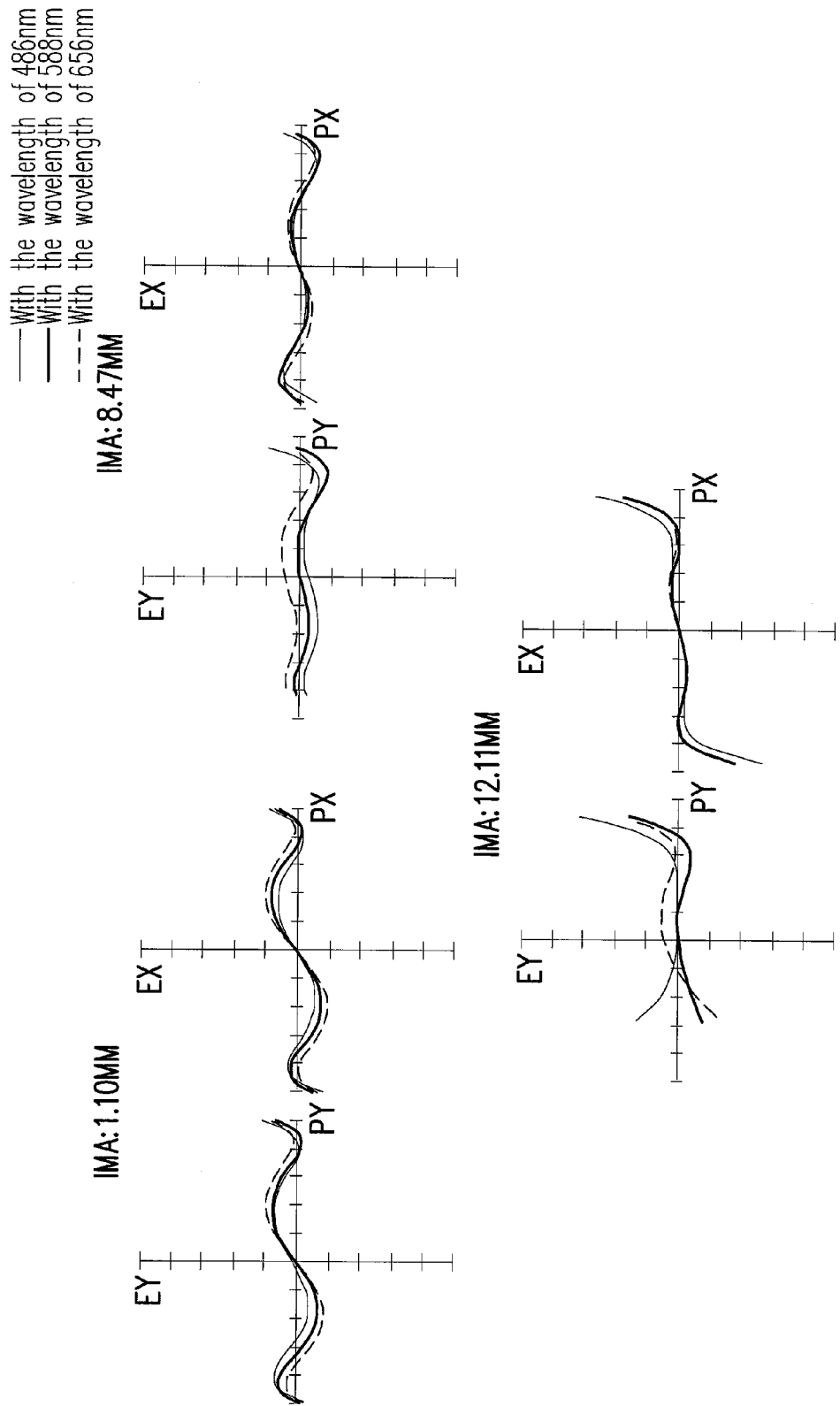
FIGS. 3-5 are diagrams showing imaging optical simulation data of the fixed focal length lens depicted in FIG. 1.
Figure 4:
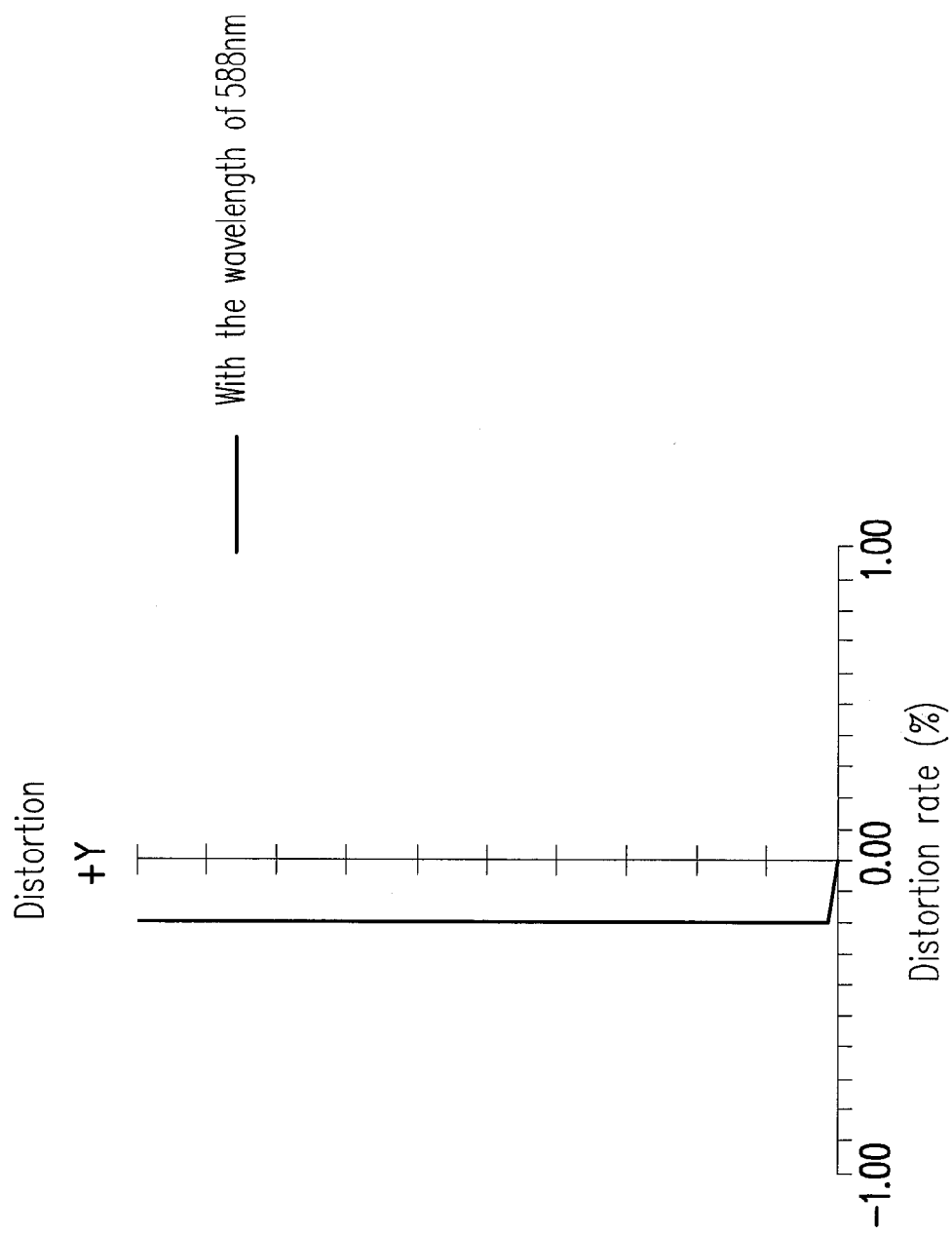
Figure 5:
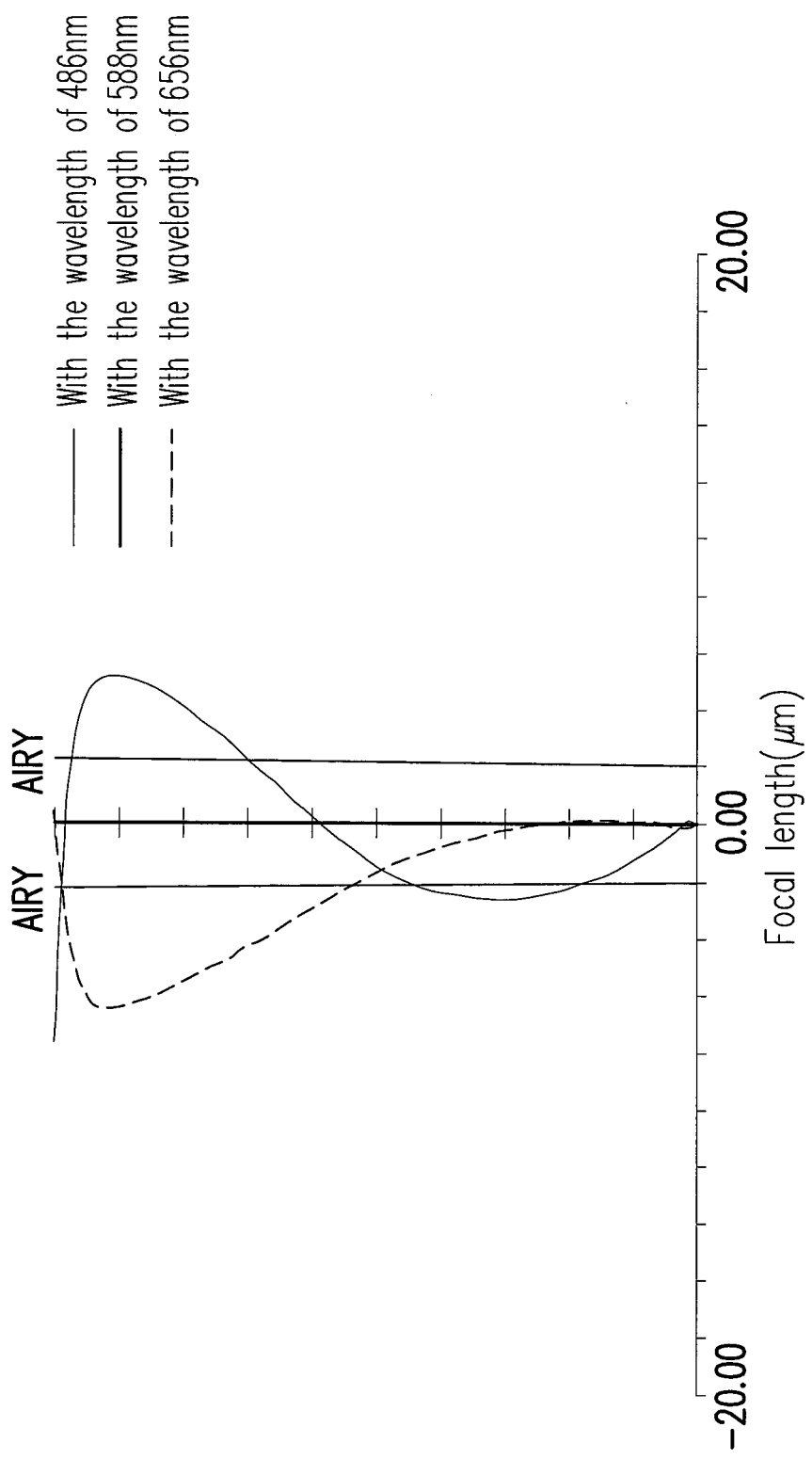

FIGS. 3-5 are diagrams showing imaging optical simulation data of the fixed focal length lens 100 depicted in FIG. 1. The simulation is conducted on three reference wavebands, i.e., red light with the wavelength of 656 nm, green light with the wavelength of 588 nm, and blue light with the wavelength of 486 nm. Please refer to FIG. 3 to FIG. 5. FIG. 3 is a transverse ray fan plot, wherein the x axis represents the position where the light passes through the aperture stop AS, and the y axis represents the position where the light strikes onto the image plane (e.g., the light valve 130). FIG. 4 shows the plot of the distortion. FIG. 5 is a lateral color diagram, wherein the abscissa represents the distance from an intersection of the primary lights with three wavelengths on the imaging plane to the intersection of the primary light with the central wavelength on the imaging plane, and the ordinate represents a field radius. Since everything shown in FIG. 3 to FIG. 5 falls within a standard range, the fixed focal length lens 100 described in this embodiment may have favorable imaging quality.

Second Embodiment

Figure 6:
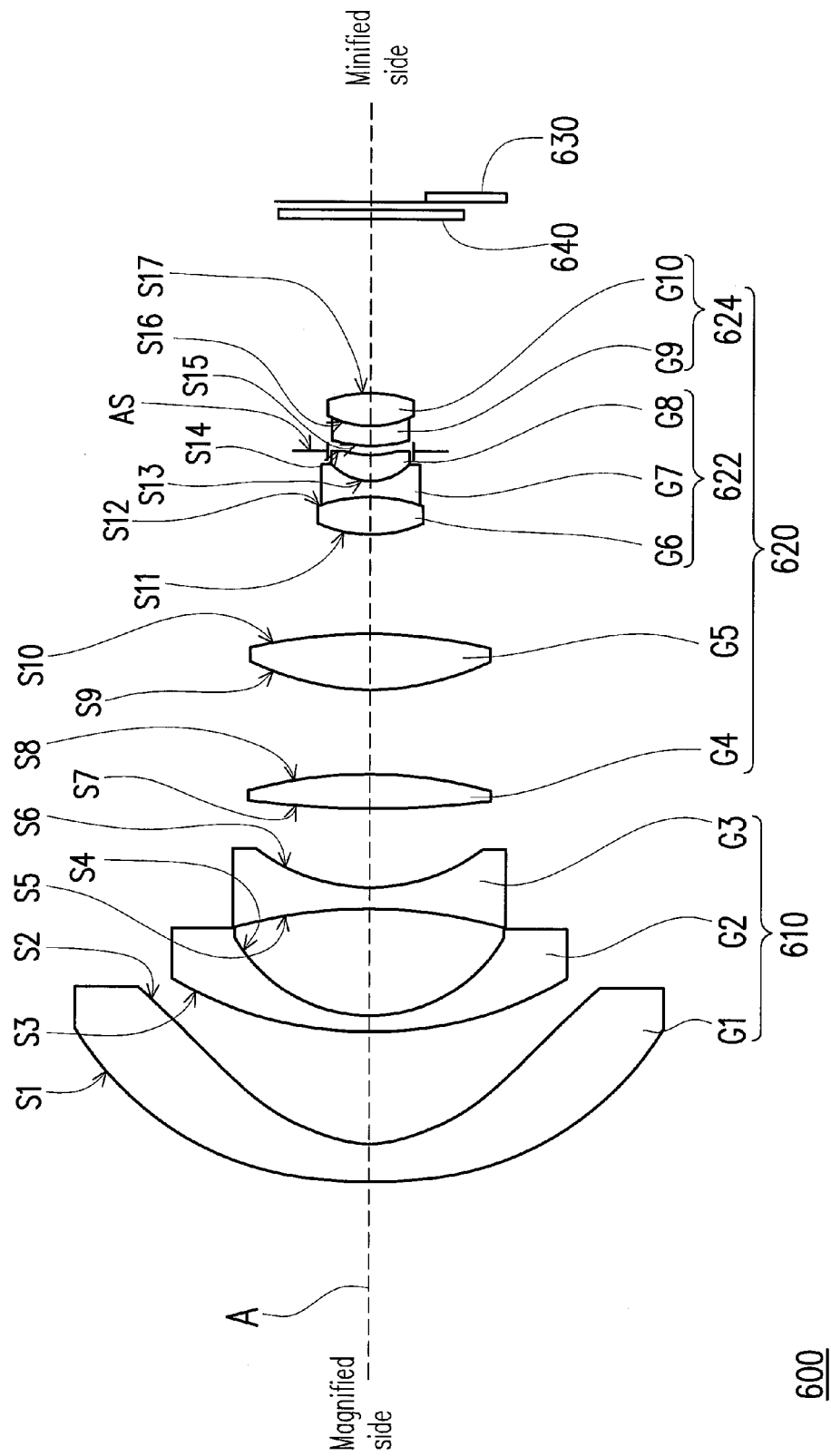
FIG. 6 is a schematic view illustrating a structure of a fixed focal length lens according to a second embodiment of the invention.

FIG. 6 is a schematic view illustrating a structure of a fixed focal length lens according to a second embodiment of the invention. With reference to FIG. 6, the fixed focal length lens 600 is suitable for being disposed between a magnified side and a minified side, and the fixed focal length lens 600 has an optical axis A and includes a first lens group 610 and a second lens group 620.

The first lens group 610 has a negative refractive power and includes a first lens G1, a second lens G2, and a third lens G3 sequentially arranged from the magnified side to the minified side. A refractive power of the first lens G1, a refractive power of the second lens G2, and a refractive power of the third lens G3 are sequentially negative, negative, and negative. The second lens group 620 is disposed between the first lens group 610 and the minified side and has a positive refractive power. Besides, the second lens group 620 includes a fourth lens G4, a fifth lens G5, a sixth lens G6, a seventh lens G7, an eighth lens G8, a ninth lens G9, and a tenth lens G10 sequentially arranged from the magnified side to the minified side. A refractive power of the fourth lens G4, a refractive power of the fifth lens G5, a refractive power of the sixth lens G6, a refractive power of the seventh lens G7, a refractive power of the eighth lens G8, a refractive power of the ninth lens G9, and a refractive power of the tenth lens G10 are sequentially positive, positive, positive, negative, positive, negative, and positive from the magnified side to the minified side.

In the embodiment, the position of the second lens group 620 in the fixed focal length lens 600 is fixed, and the first lens group 610 moves relative to the second lens group 620 to focus. Namely, the first lens group 610 is a focusing lens group suitable for conducting a focus-adjusting compensation at different projection distances.

Generally, an image processing device 630 may be disposed on the minified side. The imaging process device 630 described in the embodiment is a light valve, and the light valve may be a DMD, an LCOS panel, or a transmissive LCD, for instance. Besides, in the present embodiment, the fixed-focus lens 600 is adapted for imaging an image provided by the image processing device 630 at the magnified side.

In addition, as shown in FIG. 6, the fixed focal length lens 600 described in the embodiment further includes an aperture stop AS disposed between the eighth lens G8 and the ninth lens G9. A glass cover 640 is further disposed between the image processing device 630 and the tenth lens G10 to protect the image processing device 630.

To ensure the optical imaging quality, the fixed-focus lens 600 in the embodiment may satisfy $0.515<|f_1/f|<1.299$ and $2.313<|f_2/f|<5.724$. Here, f refers to an EFL of the fixed focal length lens 600, $f_1$ refers to an EFL of the first lens group 610, and $f_2$ refers to an EFL of the second lens group 620.

An embodiment of the fixed focal length lens 600 is given hereinafter. However, the invention is not limited to the data listed in Table 3. People having ordinary skill in the art may be able to properly modify the parameters or the configuration of the invention in view of the invention without departing from the scope or spirit of the invention.

TABLE 3

| Surface | Curvature Radius (mm) | Interval (mm) | Refraction Index | Abbe Number | Notes |
|---|---|---|---|---|---|
| S1 | 74.73 | 4.76 | 1.49 | 57.44 | First lens |
| S2 | 21.16 | 13.76 | | | |

TABLE 3-continued

| Surface | Curvature Radius (mm) | Interval (mm) | Refraction Index | Abbe Number | Notes |
|---|---|---|---|---|---|
| S3 | 49.53 | 2.00 | 1.74 | 44.79 | Second lens |
| S4 | 18.26 | 12.98 | | | |
| S5 | −52.91 | 2.63 | 1.74 | 44.79 | Third lens |
| S6 | 23.34 | Variable | | | |
| S7 | 375.11 | 3.85 | 1.69 | 31.08 | Fourth lens |
| S8 | −58.67 | 10.39 | | | |
| S9 | 30.83 | 6.93 | 1.60 | 39.24 | Fifth lens |
| S10 | −85.27 | 12.58 | | | |
| S11 | 14.34 | 4.07 | 1.49 | 70.24 | Sixth lens |
| S12 | −17.98 | 2.50 | 1.83 | 37.16 | Seventh lens |
| S13 | 6.96 | 3.24 | 1.73 | 28.46 | Eighth lens |
| S14 | 71.99 | 1.00 | | | Aperture stop |
| S15 | 34.61 | 2.41 | 1.85 | 23.78 | Ninth lens |
| S16 | 10.03 | 3.91 | 1.58 | 59.03 | Tenth lens |
| S17 | −14.15 | 21.50 | | | |

In Table 3, the interval refers to a linear distance on the optical axis A between two adjacent surfaces. For instance, the interval of the surface S1 refers to the linear distance between the surface S1 and the surface S2 on the optical axis A. The thickness, the refraction index, and the abbe number corresponding to each of the lenses listed in the "Notes" columns may be referred to as the corresponding values of the interval, the refraction index, and the abbe number listed in the corresponding rows. In the embodiment, the position of the second lens group 620 in the fixed focal length lens 600 remains unchanged, and the first lens group 610 moves relative to the second lens group 620 to focus. Therefore, the interval of the surface S6 is marked as "variable", which indicates the linear distance on the optical axis between the surface S6 and the surface S7 is variable. According to an embodiment, when a projection distance is relatively short, the interval of the surface S6 is 9.46 mm, for instance; according to another embodiment, when a projection distance is relatively long, the interval of the surface S6 is 9.37 mm, for instance.

Moreover, in Table 3, the surfaces S1 and S2 are two surfaces of the first lens G1, the surfaces S3 and S4 are two surfaces of the second lens G2, the surfaces S5 and S6 are two surfaces of the third lens G3, the surfaces S7 and S8 are two surfaces of the fourth lens G4, the surfaces S9 and S10 are two surfaces of the fifth lens G5, the surface S11 is a surface of the sixth lens G6 facing the magnified side, the surface S12 is a surface where the sixth lens G6 is connected to the seventh lens G7, the surface S13 is a surface where the seventh lens G7 is connected to the eighth lens G8, and the surface S14 is a surface of the eight lens G8 facing the minified side. Here, the surface S14 is also the place where the aperture stop AS is located. The surface S15 is a surface of the ninth lens G9 facing the magnified side, the surface S16 is a surface where the ninth lens G9 is connected to the tenth lens G10, and the surface S17 is surface of the tenth lens G10 facing the minified side. The numeral values of the parameters, such as the curvature radius and the interval of each surface, are given in Table 3 and thus will not be repeated hereinafter.

The surfaces S1 and S2 of the first lens G1 are aspheric surfaces and may be represented by the following formula:

$$Z = \frac{cy^2}{1+\sqrt{1-(1+K)c^2y^2}} + A_1 y^1 + A_2 y^2 + A_3 y^3 + A_4 y^4 + A_5 y^5 + A_6 y^6 + A_7 y^7 + A_8 y^8 + A_9 y^9 + A_{10} y^{10} + A_{11} y^{11} + A_{12} y^{12} + A_{13} y^{13} + A_{14} y^{14}$$

Similarly, in the formula, Z is a sag in the direction of the optical axis A, and c is the inverse of the radius of an osculating sphere, i.e. the inverse of the curvature radii (e.g., the curvature radii of the surfaces S1 and S2 in Table 3) close to the optical axis A. K is a conic coefficient, y is an aspheric height, and $A_1$ to $A_{14}$ are aspheric coefficients. The parameter values of the surfaces S1 and S2 are listed in Table 4.

TABLE 4

Aspheric Parameter

| | Conic Coefficient K | Coefficient $A_1$ | Coefficient $A_2$ | Coefficient $A_3$ | Coefficient $A_4$ |
|---|---|---|---|---|---|
| S1 | 1.01223 | −5.84E−05 | 9.93E−05 | −1.21E−07 | 1.47E−05 |
| S2 | −0.58300 | −5.99E−05 | −4.12E−05 | 6.90E−07 | 1.66E−05 |

Aspheric Parameter

| | Coefficient $A_5$ | Coefficient $A_6$ | Coefficient $A_7$ | Coefficient $A_8$ | Coefficient $A_9$ |
|---|---|---|---|---|---|
| S1 | −2.88E−09 | −2.47E−08 | 6.19E−12 | 2.72E−11 | −5.77E−15 |
| S2 | −3.72E−09 | −2.28E−08 | 1.21E−11 | −2.90E−11 | −1.88E−14 |

Aspheric Parameter

| | Coefficient $A_{10}$ | Coefficient $A_{11}$ | Coefficient $A_{12}$ | Coefficient $A_{13}$ | Coefficient $A_{14}$ |
|---|---|---|---|---|---|
| S1 | −1.71E−14 | 2.81E−18 | 5.84E−18 | −6.09E−22 | −6.79E−22 |
| S2 | −1.06E−18 | 1.17E−17 | 5.29E−17 | −2.26E−21 | −3.40E−20 |

According to the present embodiment, it may be learned that the first lens G1 is an aspheric lens and thus the first lens G1 may effectively resolve coma issues, astigmatism issues, or distortion issues of the fixed focal length lens 600. Besides, in the embodiment, the optimal range of the EFL of the fixed focal length lens 600 is 7.24 mm to 7.27 mm, which should however not be construed as a limitation to the invention. Besides, the numerical aperture (F/#) is 2.79, and the viewing angle (2ω) is greater than 116.6°.

The surface S17 of the tenth lens G10 is an aspheric surface with even power and may be represented by the following formula:

$$Z = \frac{cy^2}{1 + \sqrt{1 - (1+K)c^2 y^2}} + A_1 y^4 + A_2 y^6 + A_3 y^8 + A_4 y^{10} + A_5 y^{12} + A_6 y^{14}$$

Similarly, in the formula, Z is a sag in the direction of the optical axis A, and c is the inverse of the radius of an osculating sphere, i.e. the inverse of the curvature radii (e.g., the curvature radii of the surface S17 in Table 3) close to the optical axis A. K is a conic coefficient, y is an aspheric height, and $A_1$ to $A_6$ are aspheric coefficients. Table 5 lists the parameter values of the surface S17.

TABLE 5

| Aspheric Parameter | Conic Coefficient K | Coefficient $A_1$ | Coefficient $A_2$ | Coefficient $A_3$ | Coefficient $A_4$ | Coefficient $A_5$ | Coefficient $A_6$ |
|---|---|---|---|---|---|---|---|
| S17 | 0 | −1.67E−05 | −6.49E−07 | −5.70E−11 | −6.38E−10 | −2.81E−12 | 7.86E−14 |

Moreover, the fixed focal length lens 600 described herein satisfies F/H>0.52, where F is an EFL of the fixed focal length lens 600, and H is an image height. The definition of the image height H may be referred to as that depicted in FIG. 2 and thus will not be further described hereinafter. If F/H>1, the viewing angle (2ω) of the fixed focal length lens 600 is less than 90°. At this time, the projection angle is not considered as a wide angle, and thus the imaging quality is not negatively affected even though the first lens G1 described herein is not an aspheric lens. However, if F/H<0.52, the viewing angle (2ω) of the fixed focal length lens 600 is greater than 140°; therefore, more aspheric lenses and other lenses are required to compensate the aberration.

With reference to FIG. 6, in the first lens group 610 described in the embodiment, each of the first lens G1 and the second lens G2 is a convex-concave lens with a convex surface facing the magnified side, and the third lens G3 is a biconcave lens. Each of the second lens G2 and the third lens G3 is a spherical lens, for instance. Due to the compensation resulting from the aspheric lens in the first lens group 610, at least the distortion issue may be effectively resolved.

According to the present embodiment, in the second lens group 620, each of the fourth lens G4, the fifth lens G5, the sixth lens G6, and the tenth lens G10 is a biconvex lens, the seventh lens G7 is a biconcave lens, the eighth lens G8 is a concave-convex lens with a convex surface facing the magnified side, and the ninth lens G9 is a convex-concave lens with a convex surface facing the magnified side. In the second lens group 620, the sixth lens G6, the seventh lens G7, and the eighth lens G8 together form a triple cemented lens 622, and the ninth lens G9 and the tenth lens G10 together form a double cemented lens 624. Thereby, the spherical aberration issue, the field curvature issue, and the color aberration issue of the fixed focal length lens 600 may be effectively resolved. Besides, the tenth lens G10 is an aspheric lens. Aside from the tenth lens G10, other lenses of the second lens group 620 are spherical lenses, for instance. Since the tenth lens G10 is the biconvex lens, the light at the minified side may be effectively collected, and the collected light may pass through the lenses and be projected on the magnified side.

Third Embodiment

Figure 7:
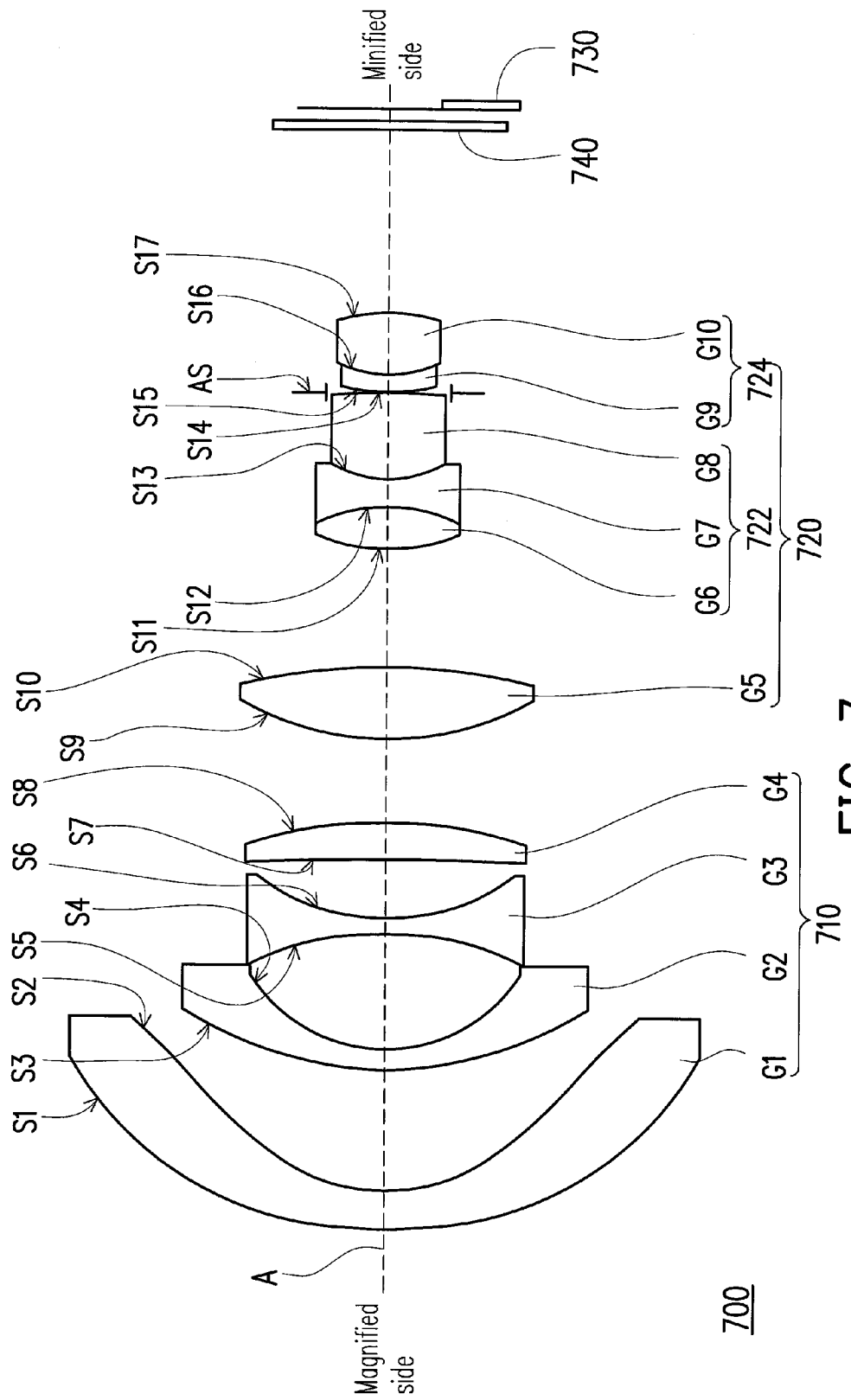
FIG. 7 is a schematic view illustrating a structure of a fixed focal length lens according to a third embodiment of the invention.

FIG. 7 is a schematic view illustrating a structure of a fixed focal length lens according to a third embodiment of the invention. With reference to FIG. 7, the fixed focal length lens 700 is suitable for being disposed between a magnified side and a minified side, and the fixed focal length lens 700 has an optical axis A and includes a first lens group 710 and a second lens group 720.

The first lens group 710 has a negative refractive power and includes a first lens G1, a second lens G2, a third lens G3, and a fourth lens G4 sequentially arranged from the magnified side to the minified side. A refractive power of the first lens G1, a refractive power of the second lens G2, a refractive power of the third lens G3, and a refractive power of the fourth lens G4 are sequentially negative, negative, negative, and positive. The second lens group 720 is disposed between the first lens group 710 and the minified side and has a positive refractive power. Besides, the second lens group 720 includes a fifth lens G5, a sixth lens G6, a seventh lens G7, an eighth lens G8, a ninth lens G9, and a tenth lens G10 sequentially arranged from the magnified side to the minified side. A refractive power of the fifth lens G5, a refractive power of the sixth lens G6, a refractive power of the seventh lens G7, a refractive power of the eighth lens G8, a refractive power of the ninth lens G9, and a refractive power of the tenth lens G10 are sequentially positive, positive, negative, positive, negative, and positive from the magnified side to the minified side.

In the embodiment, the position of the second lens group 720 in the fixed focal length lens 700 is fixed, and the first lens group 710 moves relative to the second lens group 720 to focus. Namely, the first lens group 710 is a focusing lens group suitable for conducting a focus-adjusting compensation at different projection distances.

Generally, an image processing device 730 may be disposed on the minified side. The imaging process device 730 described in the embodiment is a light valve, and the light valve may be a DMD, an LCOS panel, or a transmissive LCD, for instance. Besides, in the embodiment, the fixed focal length lens 700 is used to form an image provided by the image processing device 730 at the magnified side.

In addition, as shown in FIG. 7, the fixed focal length lens 700 described in the embodiment further includes an aperture stop AS disposed between the eighth lens G8 and the ninth lens G9. A glass cover 740 is further disposed between the image processing device 730 and the tenth lens G10 to protect the image processing device 730.

To ensure the optical imaging quality, the fixed focal length lens 700 in the embodiment may satisfy $0.978 < f_1/f < 2.983$ and $2.010 < |f_2/f| < 5.419$. Here, f refers to an EFL of the fixed focal length lens 700, $f_1$ refers to an EFL of the first lens group 710, and $f_2$ refers to an EFL of the second lens group 720.

An embodiment of the fixed focal length lens 700 is given hereinafter. However, the invention is not limited to the data listed in Table 6. People having ordinary skill in the art may be able to properly modify the parameters or the configuration of the invention in view of the invention without departing from the scope or spirit of the invention.

TABLE 6

| Surface | Curvature Radius (mm) | Interval (mm) | Refraction Index | Abbe Number | Notes |
|---|---|---|---|---|---|
| S1 | 54.29 | 3.50 | 1.49 | 57.30 | First lens |
| S2 | 20.84 | 14.33 | | | |
| S3 | 42.49 | 2.00 | 1.80 | 55.00 | Second lens |
| S4 | 17.21 | 13.39 | | | |
| S5 | −39.70 | 2.00 | 1.78 | 37.60 | Third lens |
| S6 | 24.56 | 6.73 | | | |
| S7 | −335.68 | 4.19 | 1.85 | 23.00 | Fourth lens |
| S8 | −47.96 | Variable | | | |
| S9 | 33.76 | 8.37 | 1.62 | 43.40 | Fifth lens |
| S10 | −61.44 | 13.63 | | | |
| S11 | 22.26 | 4.71 | 1.51 | 54.20 | Sixth lens |
| S12 | −20.24 | 3.30 | 1.83 | 37.20 | Seventh lens |
| S13 | 11.63 | 10.00 | 1.62 | 36.90 | Eighth lens |
| S14 | −35.78 | 0.10 | | | Aperture stop |
| S15 | 28.77 | 2.00 | 1.85 | 23.80 | Ninth lens |
| S16 | 14.18 | 7.06 | 1.49 | 79.70 | Tenth lens |
| S17 | −20.16 | 21.50 | | | |

In Table 6, the interval refers to a linear distance on the optical axis A between two adjacent surfaces. For instance, the interval of the surface S1 refers to the linear distance on the optical axis A between the surface S1 and the surface S2. The thickness, the refraction index, and the abbe number corresponding to each of the lenses listed in the "Notes" columns may be referred to as the corresponding values of the interval, the refraction index, and the abbe number listed in the corresponding rows. In the embodiment, the position of the second lens group 720 in the fixed focal length lens 700 remains unchanged, and the first lens group 710 moves relative to the second lens group 720 to focus. Therefore, the interval of the surface S8 is marked as "variable", which indicates the linear distance on the optical axis between the surface S8 and the surface S9 is variable. According to an embodiment, when a projection distance is relatively short, the interval of the surface S8 is 3.68 mm, for instance; according to another embodiment, when a projection distance is relatively long, the interval of the surface S8 is 3.59 mm, for instance.

Moreover, in Table 6, the surfaces S1 and S2 are two surfaces of the first lens G1, the surfaces S3 and S4 are two surfaces of the second lens G2, the surfaces S5 and S6 are two surfaces of the third lens G3, the surfaces S7 and S8 are two surfaces of the fourth lens G4, the surfaces S9 and S10 are two surfaces of the fifth lens G5, the surface S11 is a surface of the sixth lens G6 facing the magnified side, the surface S12 is a surface where the sixth lens G6 is connected to the seventh lens G7, the surface S13 is a surface where the seventh lens G7 is connected to the eighth lens G8, and the surface S14 is a surface of the eight lens G8 facing the minified side. Here, the surface S14 is also the place where the aperture stop AS is located. The surface S15 is a surface of the ninth lens G9 facing the magnified side, the surface S16 is a surface where the ninth lens G9 is connected to the tenth lens G10, and the surface S17 is surface of the tenth lens G10 facing the minified side. The numeral values of the parameters, such as the curvature radius and the interval of each surface, are given in Table 6 and thus will not be repeated hereinafter.

The surfaces S1 and S2 of the first lens G1 are aspheric surfaces and may be represented by the following formula:

$$Z = \frac{cy^2}{1 + \sqrt{1-(1+K)c^2y^2}} + A_1y^1 + A_2y^2 + A_3y^3 + A_4y^4 + A_5y^5 + A_6y^6 + A_7y^7 + A_8y^8 + A_9y^9 + A_{10}y^{10} + A_{11}y^{11} + A_{12}y^{12} + A_{13}y^{13} + A_{14}y^{14}$$

Similarly, in the formula, Z is a sag in the direction of the optical axis A, and c is the inverse of the radius of an osculating sphere, i.e. the inverse of the curvature radii (e.g., the curvature radii of the surfaces S1 and S2 in Table 6) close to the optical axis A. K is a conic coefficient, y is an aspheric height, and $A_1$ to $A_{14}$ are aspheric coefficients. The parameter values of the surfaces S1 and S2 are listed in Table 7.

TABLE 7

| | Aspheric Parameter | | | | |
|---|---|---|---|---|---|
| | Conic Coefficient K | Coefficient $A_1$ | Coefficient $A_2$ | Coefficient $A_3$ | Coefficient $A_4$ |
| S1 | 9.46E−01 | −9.37E−03 | 3.30E−03 | −5.00E−04 | 2.49E−05 |
| S2 | −6.27E−01 | −4.93E−03 | 4.61E−03 | −3.96E−04 | 1.60E−05 |
| | Aspheric Parameter | | | | |
| | Coefficient $A_5$ | Coefficient $A_6$ | Coefficient $A_7$ | Coefficient $A_8$ | Coefficient $A_9$ |
| S1 | 3.14E−08 | −2.58E−08 | −3.97E−11 | 2.63E−11 | −1.17E−14 |
| S2 | 2.39E−07 | −1.53E−08 | 1.32E−10 | −2.98E−11 | −1.53E−13 |
| | Aspheric Parameter | | | | |
| | Coefficient $A_{10}$ | Coefficient $A_{11}$ | Coefficient $A_{12}$ | Coefficient $A_{13}$ | Coefficient $A_{14}$ |
| S1 | −1.69E−14 | 1.44E−17 | 6.21E−18 | 2.90E−21 | −1.11E−21 |
| S2 | −5.64E−15 | −1.34E−16 | 5.10E−17 | 7.36E−20 | −2.69E−20 |

According to the present embodiment, it may be learned that the first lens G1 is an aspheric lens and thus the first lens G1 may effectively resolve coma issues, astigmatism issues, or distortion issues of the fixed focal length lens 700. Besides, in the embodiment, the optimal range of the EFL of the fixed focal length lens 700 is 7.84 mm to 8.02 mm, which should however not be construed as a limitation to the invention. Besides, the numerical aperture (F/#) ranges from 2.86 to 2.88, and the viewing angle (2ω) is greater than 116.9°.

Moreover, the fixed focal length lens 700 described herein satisfies F/H>0.52, where F is an EFL of the fixed focal length lens 700, and H is an image height. The definition of the image height H may be referred to as that depicted in FIG. 2 and thus will not be further described hereinafter. If F/H>1, the viewing angle (2ω) of the fixed focal length lens 700 is less than 90°. At this time, the projection angle is not considered as a wide angle, and thus the imaging quality is not negatively affected even though the first lens G1 described herein is not an aspheric lens. However, if F/H<0.52, the viewing angle (2ω) of the fixed focal length lens 700 is greater than 140°; therefore, more aspheric lenses and other lenses are required to compensate the aberration.

With reference to FIG. 7, in the first lens group 710 described in the embodiment, each of the first lens G1 and the second lens G2 is a convex-concave lens with a convex surface facing the magnified side, the third lens G3 is a biconcave lens, and the fourth lens G4 is a concave-convex lens with a convex surface facing the minified side. Each of the second lens G2, the third lens G3, and the fourth lens G4 is a spherical lens, for instance. Due to the compensation resulting from the aspheric lens in the first lens group 710, at least the distortion issue may be effectively resolved.

According to the embodiment, in the second lens group 720, each of the fifth lens G5, the sixth lens G6, the eighth lens G8, and the tenth lens G10 is a biconvex lens, the seventh lens G7 is a biconcave lens, and the ninth lens G9 is a convex-concave lens with a convex surface facing the magnified side. In the second lens group 720, the sixth lens G6, the seventh lens G7, and the eighth lens G8 together form a triple cemented lens 722, and the ninth lens G9 and the tenth lens G10 together form a double cemented lens 724. Thereby, the spherical aberration issue, the field curvature issue, and the color aberration issue of the fixed focal length lens 700 may be effectively resolved. Moreover, the lenses in the second lens group 720 are all spherical lenses, for instance. Since the tenth lens G10 is the biconvex lens, the light at the minified side may be effectively collected, and the collected light may pass through the lenses and be projected on the magnified side.

Fourth Embodiment

Figure 8:
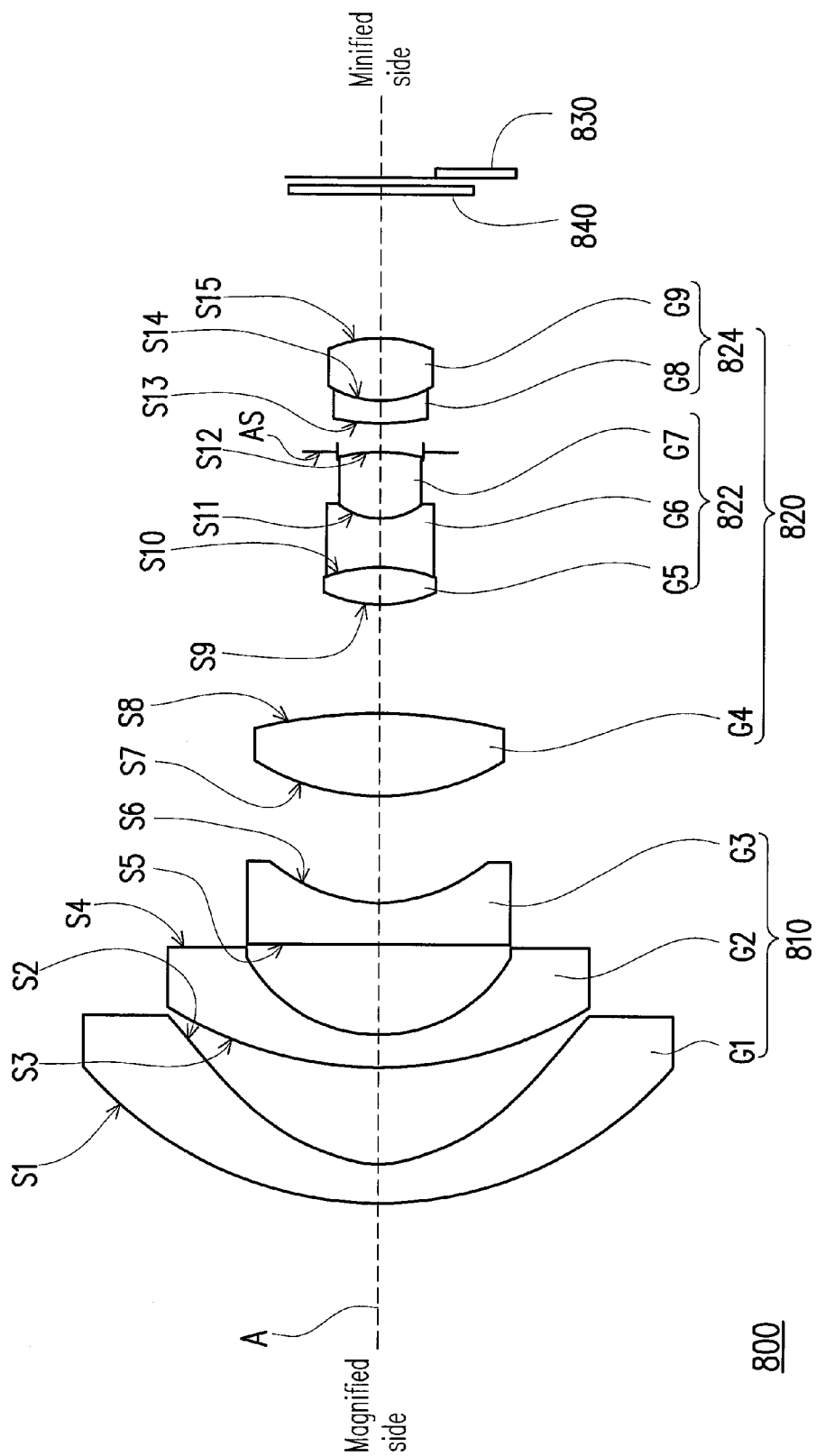
FIG. 8 is a schematic view illustrating a structure of a fixed focal length lens according to a fourth embodiment of the invention.

FIG. 8 is a schematic view illustrating a structure of a fixed focal length lens according to a fourth embodiment of the invention. With reference to FIG. 8, the fixed focal length lens 800 is suitable for being disposed between a magnified side and a minified side, and the fixed focal length lens 800 has an optical axis A and includes a first lens group 810 and a second lens group 820.

The first lens group 810 has a negative refractive power and includes a first lens G1, a second lens G2, and a third lens G3 sequentially arranged from the magnified side to the minified side. A refractive power of the first lens G1, a refractive power of the second lens G2, and a refractive power of the third lens G3 are sequentially negative, negative, and negative. The second lens group 820 is disposed between the first lens group 810 and the minified side and has a positive refractive power. Besides, the second lens group 820 includes a fourth lens G4, a fifth lens G5, a sixth lens G6, a seventh lens G7, an eighth lens G8, and a ninth lens G9 sequentially arranged from the magnified side to the minified side. A refractive power of the fourth lens G4, a refractive power of the fifth lens G5, a refractive power of the sixth lens G6, a refractive power of the seventh lens G7, a refractive power of the eighth lens G8, and a refractive power of the ninth lens G9 are sequentially positive, positive, negative, positive, negative, and positive from the magnified side to the minified side.

In the embodiment, the position of the second lens group 820 in the fixed focal length lens 800 is fixed, and the first lens group 810 moves relative to the second lens group 820 to focus. Namely, the first lens group 810 is a focusing lens group suitable for conducting a focus-adjusting compensation at different projection distances.

Generally, an image processing device 830 may be disposed on the minified side. The imaging process device 830 described in the present embodiment is a light valve, and the light valve may be a DMD, an LCOS panel, or a transmissive LCD, for instance. Besides, in the present embodiment, the fixed focal length lens 800 is used to form an image provided by the image processing device 830 at the magnified side.

In addition, as shown in FIG. 8, the fixed focal length lens 800 described in the embodiment further includes an aperture stop AS disposed between the seventh lens G7 and the eighth lens G8. A glass cover 840 is further disposed between the image processing device 830 and the ninth lens G9 to protect the image processing device 830.

To ensure the optical imaging quality, the fixed focal length lens 800 in the embodiment may satisfy $0.978<|f_1/f|<2.983$ and $2.010<|f_2/f|<5.419$. Here, f refers to an EFL of the fixed focal length lens 800, $f_1$ refers to an EFL of the first lens group 810, and $f_2$ refers to an EFL of the second lens group 820.

An embodiment of the fixed focal length lens 800 is given hereinafter. However, the invention is not limited to the data listed in Table 8. People having ordinary skill in the art may be able to properly modify the parameters or the configuration of the invention in view of the invention without departing from the scope or spirit of the invention.

TABLE 8

| Surface | Curvature Radius (mm) | Interval (mm) | Refraction Index | Abbe Number | Notes |
|---|---|---|---|---|---|
| S1 | 58.91 | 4.91 | 1.49 | 57.3 | First lens |
| S2 | 20.33 | 12.24 | | | |
| S3 | 54.53 | 2.21 | 1.70 | 48.9 | Second lens |
| S4 | 17.50 | 13.05 | | | |
| S5 | −204.56 | 5.07 | 1.64 | 56.2 | Third lens |
| S6 | 21.20 | Variable | | | |
| S7 | 32.48 | 10.00 | 1.65 | 34.4 | Fourth lens |
| S8 | −62.16 | 13.46 | | | |
| S9 | 18.65 | 4.52 | 1.50 | 61.8 | Fifth lens |
| S10 | −21.96 | 6.32 | 1.74 | 44.0 | Sixth lens |
| S11 | 9.36 | 8.32 | 1.59 | 62.1 | Seventh lens |
| S12 | −39.24 | 3.57 | | | Aperture stop |
| S13 | 35.13 | 2.77 | 1.76 | 27.6 | Eighth lens |
| S14 | 13.44 | 7.75 | 1.51 | 63.1 | Ninth lens |
| S15 | −20.54 | 17.66 | | | |

In Table 8, the interval refers to a linear distance between two adjacent surfaces on the optical axis A. For instance, the interval of the surface S1 refers to the linear distance on the optical axis A between the surface S1 and the surface S2. The thickness, the refraction index, and the abbe number corresponding to each of the lenses listed in the "Notes" columns may be referred to as the corresponding values of the interval, the refraction index, and the abbe number listed in the corresponding rows. In the embodiment, the position of the second lens group 820 in the fixed focal length lens 800 remains unchanged, and the first lens group 810 moves relative to the second lens group 820 to focus. Therefore, the interval of the surface S6 is marked as "variable", which indicates the linear distance on the optical axis between the surface S6 and the surface S7 is variable. According to an embodiment, when a projection distance is relatively short, the interval of the surface S6 is 13.5 mm, for instance; according to another embodiment, when a projection distance is relatively long, the interval of the surface S6 is 13.3 mm, for instance.

Moreover, in Table 8, the surfaces S1 and S2 are two surfaces of the first lens G1, the surfaces S3 and S4 are two surfaces of the second lens G2, the surfaces S5 and S6 are two surfaces of the third lens G3, the surfaces S7 and S8 are two surfaces of the fourth lens G4, the surface S9 is a surface of the fifth lens G5 facing the magnified side, the surface S10 is a surface where the fifth lens G5 is connected to the sixth lens G6, the surface S11 is a surface where the sixth lens G6 is connected to the seventh lens G7, and the surface S12 is a surface of the seventh lens G7 facing the minified side. Here, the surface S12 is also the place where the aperture stop AS is located. The surface S13 is a surface of the eighth lens G8 facing the magnified side, the surface S14 is a surface where the eighth lens G8 is connected to the ninth lens G9, and the surface S15 is surface of the ninth lens G9 facing the minified side. The curvature radius, the interval, and other parameters of each surface are shown in Table 8 and will not be further described hereinafter.

The surfaces S1 and S2 of the first lens G1 are aspheric surfaces and may be represented by the following formula:

$$Z = \frac{cy^2}{1+\sqrt{1-(1+K)c^2y^2}} + A_1y^1 + A_2y^2 + A_3y^3 + A_4y^4 + A_5y^5 + A_6y^6 + A_7y^7 + A_8y^8 + A_9y^9 + A_{10}y^{10} + A_{11}y^{11} + A_{12}y^{12} + A_{13}y^{13} + A_{14}y^{14}$$

Similarly, in the formula, Z is a sag in the direction of the optical axis A, and c is the inverse of the radius of an osculating sphere, i.e. the inverse of the curvature radii (e.g., the curvature radii of the surfaces S1 and S2 in Table 8) close to the optical axis A. K is a conic coefficient, y is an aspheric height, and $A_1$ to $A_{14}$ are aspheric coefficients. The parameter values of the surfaces S1 and S2 are listed in Table 9.

TABLE 9

| | Aspheric Parameter | | | | |
|---|---|---|---|---|---|
| | Conic Coefficient K | Coefficient $A_1$ | Coefficient $A_2$ | Coefficient $A_3$ | Coefficient $A_4$ |
| S1 | 0.946386 | −9.37E−03 | 3.30E−03 | −5.00E−04 | 2.49E−05 |
| S2 | −0.62712 | −4.93E−03 | 4.61E−03 | −3.96E−04 | 1.60E−05 |

| | Aspheric Parameter | | | | |
|---|---|---|---|---|---|
| | Coefficient $A_5$ | Coefficient $A_6$ | Coefficient $A_7$ | Coefficient $A_8$ | Coefficient $A_9$ |
| S1 | 3.14E−08 | −2.58E−08 | −3.97E−11 | 2.63E−11 | −1.17E−14 |
| S2 | 2.39E−07 | −1.53E−08 | 1.32E−10 | −2.98E−11 | −1.53E−13 |

| | Aspheric Parameter | | | | |
|---|---|---|---|---|---|
| | Coefficient $A_{10}$ | Coefficient $A_{11}$ | Coefficient $A_{12}$ | Coefficient $A_{13}$ | Coefficient $A_{14}$ |
| S1 | −1.69E−14 | 1.44E−17 | 6.21E−18 | 2.90E−21 | −1.11E−21 |
| S2 | −5.64E−15 | −1.34E−16 | 5.10E−17 | 7.36E−20 | −2.69E−20 |

According to the embodiment, it may be learned that the first lens G1 is an aspheric lens and thus the first lens G1 may effectively resolve coma issues, astigmatism issues, or distortion issues of the fixed focal length lens 800. Besides, in the embodiment, the optimal range of the EFL of the fixed focal length lens 800 is 7.72 mm to 7.8 mm, which should however not be construed as a limitation to the invention. Besides, the numerical aperture (F/#) ranges from 2.6 to 2.62, and the viewing angle (2ω) is greater than 116.7°.

Moreover, the fixed focal length lens 800 described herein satisfies F/H>0.52, where F is an EFL of the fixed focal length lens 800, and H is an image height. The definition of the image height H may be referred to as that depicted in FIG. 2 and thus will not be further described hereinafter. If F/H>1, the viewing angle (2ω) of the fixed focal length lens 800 is less than 90°. At this time, the projection angle is not considered as a wide angle, and thus the imaging quality is not negatively affected even though the first lens G1 described herein is not an aspheric lens. However, if F/H<0.52, the viewing angle (2ω) of the fixed focal length lens 800 is greater than 140°; therefore, more aspheric lenses and other lenses are required to compensate the aberration.

With reference to FIG. 8, in the first lens group 810 described in the embodiment, each of the first lens G1 and the second lens G2 is a convex-concave lens with a convex surface facing the magnified side, and the third lens G3 is a biconcave lens. Each of the second G2 and the third lens G3 is a spherical lens, for instance. Due to the compensation resulting from the aspheric lens in the first lens group 810, at least the distortion issue may be effectively resolved.

According to the embodiment, in the second lens group 820, each of the fourth lens G4, the fifth lens G5, the seventh lens G7, and the ninth lens G9 is a biconvex lens, the sixth lens G6 is a biconcave lens, and the eighth lens G8 is a convex-concave lens with a convex surface facing the magnified side. In the second lens group 820, the fifth lens G5, the sixth lens G6, and the seventh lens G7 together form a triple cemented lens 822, and the eighth lens G8 and the ninth lens G9 together form a double cemented lens 824. Thereby, the spherical aberration issue, the field curvature issue, and the color aberration issue of the fixed focal length lens 800 may be effectively resolved. Moreover, the lenses in the second lens group 820 are all spherical lenses, for instance. Since the ninth lens G9 is the biconvex lens, the light at the minified side may be effectively collected, and the collected light may pass through the lenses and be projected on the magnified side.

Fifth Embodiment

Figure 9:
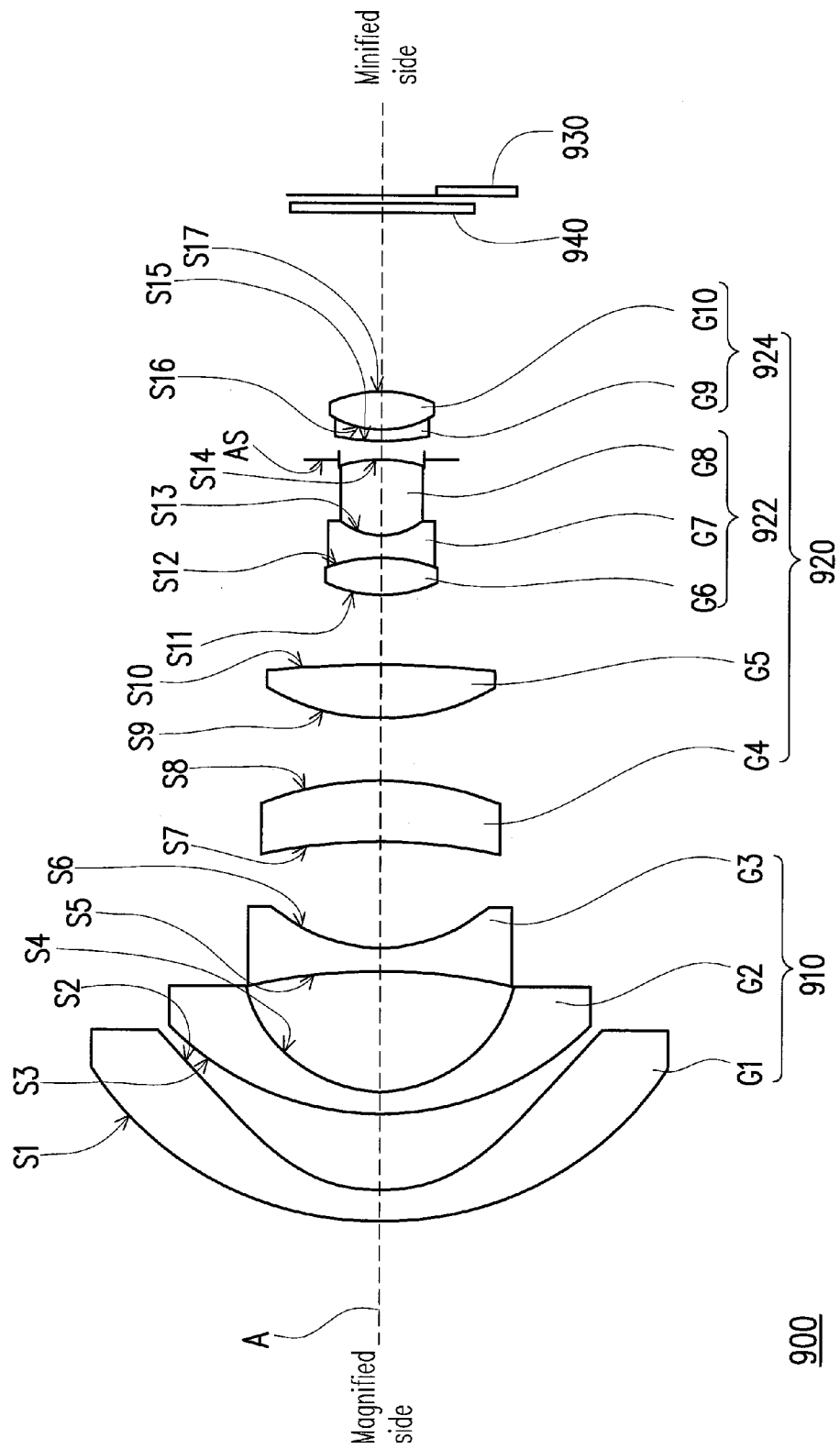
FIG. 9 is a schematic view illustrating a structure of a fixed focal length lens according to a fifth embodiment of the invention.

FIG. 9 is a schematic view illustrating a structure of a fixed focal length lens according to a fifth embodiment of the invention. With reference to FIG. 9, the fixed focal length lens 900 is suitable for being disposed between a magnified side and a minified side, and the fixed-focus lens 900 has an optical axis A and includes a first lens group 910 and a second lens group 920.

The first lens group 910 has a negative refractive power and includes a first lens G1, a second lens G2, and a third lens G3 sequentially arranged from the magnified side to the minified side. A refractive power of the first lens G1, a refractive power of the second lens G2, and a refractive power of the third lens G3 are sequentially negative, negative, and negative. The second lens group 920 is disposed between the first lens group 910 and the minified side and has a positive refractive power. Besides, the second lens group 920 includes a fourth lens G4, a fifth lens G5, a sixth lens G6, a seventh lens G7, an eighth lens G8, a ninth lens G9, and a tenth lens G10 sequentially arranged from the magnified side to the minified side. A refractive power of the fourth lens G4, a refractive power of the fifth lens G5, a refractive power of the sixth lens G6, a refractive power of the seventh lens G7, a refractive power of the eighth lens G8, a refractive power of the ninth lens G9, and a refractive power of the tenth lens G10 are sequentially positive, positive, positive, negative, positive, negative, and positive from the magnified side to the minified side.

In the embodiment, the position of the second lens group 920 in the fixed focal length lens 900 is fixed, and the first lens group 910 moves relative to the second lens group 920 to focus. Namely, the first lens group 910 is a focusing lens group suitable for conducting a focus-adjusting compensation at different projection distances.

Generally, an image processing device 930 may be disposed on the minified side. The imaging process device 930 described in the present embodiment is a light valve, and the light valve may be a DMD, an LCOS panel, or a transmissive LCD, for instance. Besides, in the embodiment, the fixed focal length lens 900 is used to form an image provided by the image processing device 930 at the magnified side.

In addition, as shown in FIG. 9, the fixed focal length lens 900 described in the embodiment further includes an aperture stop AS disposed between the eighth lens G8 and the ninth lens G9. A glass cover 940 is further disposed between the image processing device 930 and the tenth lens G10 to protect the image processing device 930.

To ensure the optical imaging quality, the fixed focal length lens 900 in the embodiment may satisfy $0.515 < |f_1/f| < 1.299$ and $2.313 < |f_2/f| < 5.724$. Here, f refers to an EFL of the fixed focal length lens 900, $f_1$ refers to an EFL of the first lens group 910, and $f_2$ refers to an EFL of the second lens group 920.

An embodiment of the fixed focal length lens 900 is given hereinafter. However, the invention is not limited to the data listed in Table 10. People having ordinary skill in the art may be able to properly modify the parameters or the configuration of the invention in view of the invention without departing from the scope or spirit of the invention.

TABLE 10

| Surface | Curvature Radius (mm) | Interval (mm) | Refraction Index | Abbe Number | Notes |
|---|---|---|---|---|---|
| S1 | 52.81 | 3.94 | 1.49 | 57.47 | First lens |
| S2 | 20.74 | 9.45 | | | |
| S3 | 51.76 | 3.00 | 1.49 | 57.40 | Second lens |
| S4 | 21.48 | 15.05 | | | |
| S5 | −59.63 | 2.20 | 1.75 | 38.95 | Third lens |
| S6 | 19.74 | Variable | | | |
| S7 | −76.49 | 7.89 | 1.76 | 27.58 | Fourth lens |
| S8 | −39.36 | 7.72 | | | |
| S9 | 26.33 | 6.85 | 1.66 | 32.70 | Fifth lens |
| S10 | −148.89 | 8.56 | | | |
| S11 | 21.73 | 4.97 | 1.49 | 70.02 | Sixth lens |
| S12 | −22.96 | 2.20 | 1.83 | 37.30 | Seven lens |
| S13 | 10.54 | 10.00 | 1.51 | 59.06 | Eighth lens |
| S14 | −37.78 | 1.77 | | | Aperture stop |
| S15 | 27.52 | 2.20 | 1.75 | 27.94 | Ninth lens |
| S16 | 14.65 | 4.14 | 1.50 | 69.47 | Tenth lens |
| S17 | −20.01 | 21.42 | | | |

In Table 10, the interval refers to a linear distance on the optical axis A between two adjacent surfaces. For instance, the interval of the surface S1 refers to the linear distance on the optical axis A between the surface S1 and the surface S2. The thickness, the refraction index, and the abbe number corresponding to each of the lenses listed in the "Notes" columns may be referred to as the corresponding values of the interval, the refraction index, and the abbe number listed in the corresponding rows. In the embodiment, the position of the second lens group 920 in the fixed focal length lens 900 remains unchanged, and the first lens group 910 moves relative to the second lens group 920 to focus. Therefore, the interval of the surface S6 is marked as "variable", which indicates the linear distance on the optical axis between the surface S6 and the surface S7. According to an embodiment, when a projection distance is relatively short, the interval of the surface S6 is 8.58 mm, for instance; according to another embodiment, when a projection distance is relatively long, the interval of the surface S6 is 8.48 mm, for instance.

Moreover, in Table 10, the surfaces S1 and S2 are two surfaces of the first lens G1, the surfaces S3 and S4 are two surfaces of the second lens G2, the surfaces S5 and S6 are two surfaces of the third lens G3, the surfaces S7 and S8 are two surfaces of the fourth lens G4, the surfaces S9 and S10 are two surfaces of the fifth lens G5, the surface S11 is a surface of the sixth lens G6 facing the magnified side, the surface S12 is a surface where the sixth lens G6 is connected to the seventh lens G7, the surface S13 is a surface where the seventh lens G7 is connected to the eighth lens G8, and the surface S14 is a surface of the eight lens G8 facing the minified side. Here, the surface S14 is also the place where the aperture stop AS is located. The surface S15 is a surface of the ninth lens G9 facing the magnified side, the surface S16 is a surface where the ninth lens G9 is connected to the tenth lens G10, and the surface S17 is surface of the tenth lens G10 facing the minified side. The curvature radius, the interval, and other parameters of each surface are shown in Table 10 and will not be further described hereinafter.

The surfaces S1 and S2 of the first lens G1 are aspheric surfaces and may be represented by the following formula:

$$Z = \frac{cy^2}{1 + \sqrt{1-(1+K)c^2y^2}} + A_1 y^1 + A_2 y^2 + A_3 y^3 + A_4 y^4 + A_5 y^5 + A_6 y^6 + A_7 y^7 + A_8 y^8 + A_9 y^9 + A_{10} y^{10} + A_{11} y^{11} + A_{12} y^{12} + A_{13} y^{13} + A_{14} y^{14}$$

Similarly, in the formula, Z is a sag in the direction of the optical axis A, and c is the inverse of the radius of an osculating sphere, i.e. the inverse of the curvature radii (e.g., the curvature radii of the surfaces S1 and S2 in Table 10) close to the optical axis A. K is a conic coefficient, y is an aspheric height, and $A_1$ to $A_{14}$ are aspheric coefficients. The parameter values of the surfaces S1 and S2 are listed in Table 11.

TABLE 11

| | Aspheric Parameter | | | | |
|---|---|---|---|---|---|
| | Conic Coefficient K | Coefficient $A_1$ | Coefficient $A_2$ | Coefficient $A_3$ | Coefficient $A_4$ |
| S1 | 1.02E+00 | −1.12E−03 | 1.92E−03 | −4.66E−04 | 2.47E−05 |
| S2 | −6.29E−01 | 4.60E−04 | 5.13E−03 | −4.01E−04 | 1.62E−05 |
| | Aspheric Parameter | | | | |
| | Coefficient $A_5$ | Coefficient $A_6$ | Coefficient $A_7$ | Coefficient $A_8$ | Coefficient $A_9$ |
| S1 | 1.25E−08 | −2.63E−08 | −3.44E−11 | 2.67E−11 | −1.20E−14 |
| S2 | 2.50E−07 | −1.49E−08 | 1.40E−10 | −2.96E−11 | −1.52E−13 |
| | Aspheric Parameter | | | | |
| | Coefficient $A_{10}$ | Coefficient $A_{11}$ | Coefficient $A_{12}$ | Coefficient $A_{13}$ | Coefficient $A_{14}$ |
| S1 | −1.70E−14 | 1.41E−17 | 6.17E−18 | 3.82E−21 | −1.18E−21 |
| S2 | −5.48E−15 | −1.36E−16 | 5.08E−17 | 5.86E−20 | −2.75E−20 |

According to the embodiment, it may be learned that the first lens G1 is an aspheric lens and thus the first lens G1 may effectively resolve coma issues, astigmatism issues, or distortion issues of the fixed focal length lens 900. Besides, in the embodiment, the optimal range of the EFL of the fixed focal length lens 900 is 7.93 mm to 7.96 mm, which should however not be construed as a limitation to the invention. Besides, the numerical aperture (F/#) is 2.79, and the viewing angle (2ω) is greater than 116.6°.

The surfaces S3 and S4 of the second lens G2 are aspheric surfaces with even power and may be represented by the following formula:

$$Z = \frac{cy^2}{1+\sqrt{1-(1+K)c^2y^2}} + A_1 y^4 + A_2 y^6 + A_3 y^8 + A_4 y^{10} + A_5 y^{12} + A_6 y^{14}$$

Similarly, in the formula, Z is a sag in the direction of the optical axis A, and c is the inverse of the radius of an osculating sphere, i.e. the inverse of the curvature radii (e.g., the curvature radii of the surfaces S3 and S4 in Table 11) close to the optical axis A. K is a conic coefficient, y is an aspheric height, and $A_1$ to $A_6$ are aspheric coefficients. The parameter values of the surfaces S3 and S4 are listed in Table 12.

TABLE 12

| Aspheric Parameter | Conic Coefficient K | Coefficient $A_1$ | Coefficient $A_2$ | Coefficient $A_3$ | Coefficient $A_4$ | Coefficient $A_5$ | Coefficient $A_6$ |
|---|---|---|---|---|---|---|---|
| S3 | −3.49E+00 | 2.03E−05 | −1.61E−08 | −5.17E−12 | 1.84E−15 | 4.56E−18 | 4.58E−21 |
| S4 | 1.27E−01 | 3.26E−05 | 2.14E−08 | 1.93E−10 | −2.85E−13 | 1.39E−16 | 9.96E−18 |

Moreover, the fixed focal length lens 900 described herein satisfies F/H>0.52, where F is an EFL of the fixed focal length lens 900, and H is an image height. The definition of the image height H may be referred to as that depicted in FIG. 2 and thus will not be further described hereinafter. If F/H>1, the viewing angle (2ω) of the fixed focal length lens 900 is less than 90°. At this time, the projection angle is not considered as a wide angle, and thus the imaging quality is not negatively affected even though the first lens G1 described herein is not an aspheric lens. However, if F/H<0.52, the viewing angle (2ω) of the fixed focal length lens 900 is greater than 140°; therefore, more aspheric lenses and other lenses are required to compensate the aberration.

With reference to FIG. 9, in the first lens group 910 described in the embodiment, each of the first lens G1 and the second lens G2 is a convex-concave lens with a convex surface facing the magnified side, and the third lens G3 is a biconcave lens. Each of the first lens G1 and the second lens G2 is an aspheric lens, and the third lens G3 is a spherical lens, for instance. Due to the compensation resulting from the aspheric lens in the first lens group 910, at least the distortion issue may be effectively resolved.

According to the embodiment, in the second lens group 920, the fourth lens G4 is a concave-convex lens with a convex surface facing the minified side, each of the fifth lens G5, the sixth lens G6, the eighth lens G8, and the tenth lens G10 is a biconvex lens, the seventh lens G7 is a biconcave lens, and the ninth lens G9 is a convex-concave lens with a convex surface facing the magnified side. In the second lens group 920, the sixth lens G6, the seventh lens G7, and the eighth lens G8 together form a triple cemented lens 922, and the ninth lens G9 and the tenth lens G10 together form a double cemented lens 924. Thereby, the spherical aberration issue, the field curvature issue, and the color aberration issue of the fixed focal length lens 900 may be effectively resolved. Moreover, the lenses in the second lens group 920 are all spherical lenses, for instance. Since the tenth lens G10 is the biconvex lens, the light at the minified side may be effectively collected, and the collected light may pass through the lens and be projected on the magnified side.

The Sixth Embodiment

Figure 10:
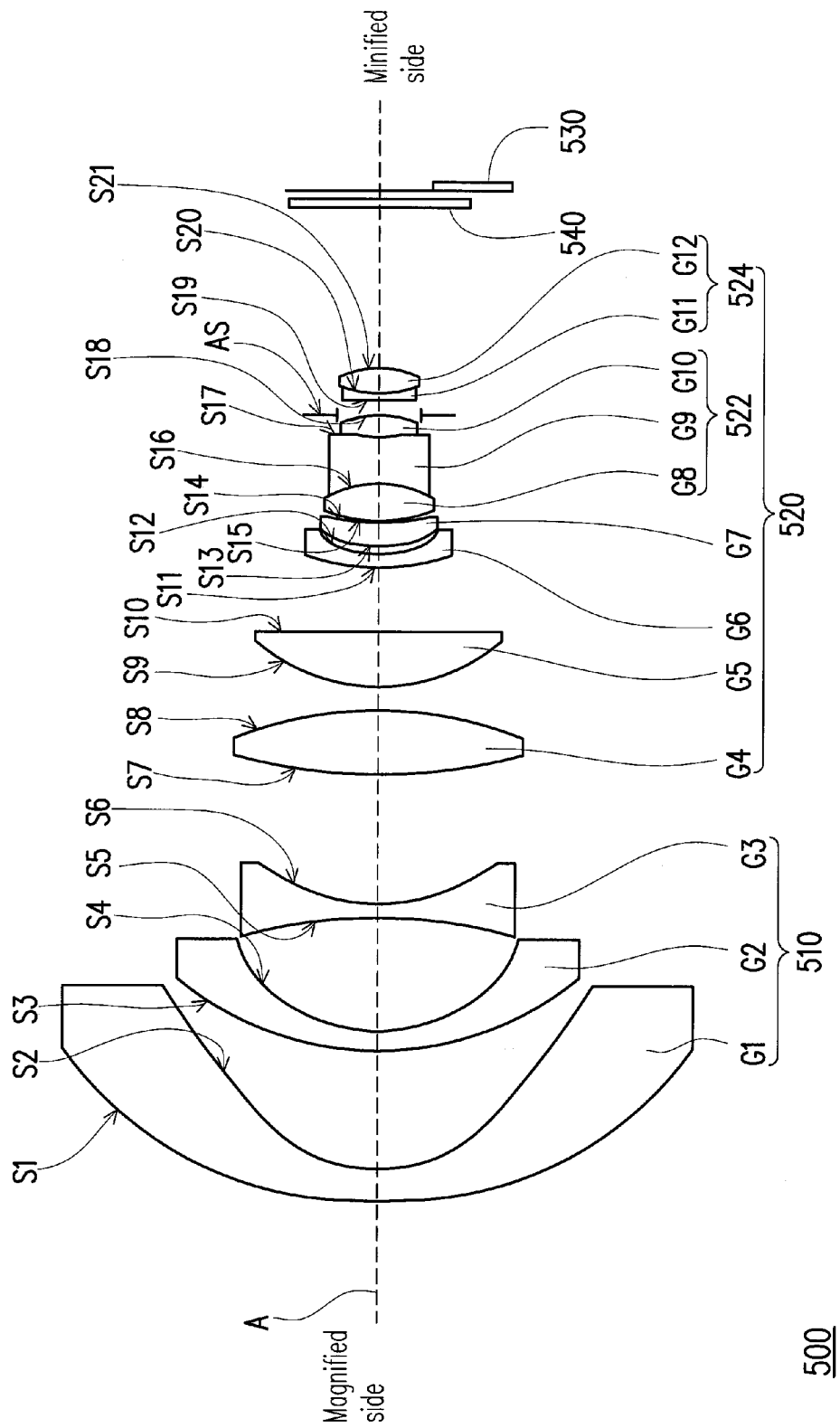
FIG. 10 is a schematic view illustrating a structure of a fixed focal length lens according to a sixth embodiment of the invention.

FIG. 10 is a schematic view illustrating a structure of a fixed focal length lens according to a sixth embodiment of the invention. With reference to FIG. 10, the fixed focal length lens 500 is suitable for being disposed between a magnified side and a minified side, and the fixed focal length lens 500 has an optical axis A and includes a first lens group 510 and a second lens group 520.

The first lens group 510 has a negative refractive power and includes a first lens G1, a second lens G2, and a third lens G3 sequentially arranged from the magnified side to the minified side. A refractive power of the first lens G1, a refractive power of the second lens G2, and a refractive power of the third lens G3 are sequentially negative, negative, and negative. The second lens group 520 is disposed between the first lens group 510 and the minified side and has a positive refractive power. Besides, the second lens group 520 includes a fourth lens G4, a fifth lens G5, a sixth lens G6, a seventh lens G7, an eighth lens G8, a ninth lens G9, a tenth lens G10, an eleventh lens G11, and a twelfth lens G12 sequentially arranged from the magnified side to the minified side. A refractive power of the fourth lens G4, a refractive power of the fifth lens G5, a refractive power of the sixth lens G6, a refractive power of the seventh lens G7, a refractive power of the eighth lens G8, a refractive power of the ninth lens G9, a refractive power of the tenth lens G10, a refractive power of the eleventh lens G11, and a refractive power of the twelfth lens G12 are sequentially positive, positive, negative, positive, positive, negative, positive, negative, and positive from the magnified side to the minified side.

In the embodiment, the position of the second lens group 520 in the fixed focal length lens 500 is fixed, and the first lens group 510 moves relative to the second lens group 520 to focus. Namely, the first lens group 510 is a focusing lens group suitable for conducting a focus-adjusting compensation at different projection distances.

Generally, an image processing device 530 may be disposed on the minified side. The imaging process device 530 described in the embodiment is a light valve, and the light valve may be a DMD, an LCOS panel, or a transmissive LCD, for instance. Besides, in the embodiment, the fixed focal length lens 500 is used to form an image provided by the image processing device 530 at the magnified side.

In addition, as shown in FIG. 10, the fixed focal length lens 500 described in the embodiment further includes an aperture stop AS disposed between the tenth lens G10 and the eleventh lens G11. A glass cover 540 is further disposed between the image processing device 530 and the twelfth lens G12 to protect the image processing device 530.

To ensure the optical imaging quality, the fixed focal length lens 500 in the embodiment may satisfy $0.515<|f_1/f|<1.299$ and $2.313<|f_2/f|<5.724$. Here, f refers to an EFL of the fixed focal length lens 500, $f_1$ refers to an EFL of the first lens group 510, and $f_2$ refers to an EFL of the second lens group 520.

An embodiment of the fixed focal length lens 500 is given hereinafter. However, the invention is not limited to the data listed in Table 13. People having ordinary skill in the art may be able to properly modify the parameters or the configuration of the invention in view of the invention without departing from the scope or spirit of the invention.

TABLE 13

| Surface | Curvature Radius (mm) | Interval (mm) | Refraction Index | Abbe Number | Notes |
|---|---|---|---|---|---|
| S1 | 104.70 | 4.00 | 1.49 | 57.47 | First lens |
| S2 | 19.76 | 15.45 | | | |
| S3 | 43.00 | 2.20 | 1.74 | 44.78 | Second lens |
| S4 | 19.46 | 15.00 | | | |
| S5 | −66.87 | 1.70 | 1.74 | 44.78 | Third lens |
| S6 | 24.97 | Variable | | | |
| S7 | 93.35 | 8.00 | 1.62 | 35.70 | Fourth lens |
| S8 | −49.22 | 3.20 | | | |
| S9 | 25.97 | 7.20 | 1.54 | 45.78 | Fifth lens |
| S10 | −6456.45 | 8.15 | | | |
| S11 | 42.45 | 1.60 | 1.74 | 44.78 | Sixth lens |
| S12 | 11.28 | 1.10 | | | |
| S13 | 14.95 | 3.20 | 1.58 | 40.74 | Seventh lens |
| S14 | 35.32 | 0.12 | | | |
| S15 | 18.81 | 4.75 | 1.54 | 45.78 | Eighth lens |
| S16 | −12.86 | 6.20 | 1.83 | 37.29 | Ninth lens |
| S17 | 27.44 | 2.75 | 1.51 | 64.16 | Tenth lens |
| S18 | −18.88 | 1.85 | | | Aperture stop |
| S19 | 47.38 | 0.80 | 1.85 | 32.17 | Eleventh lens |
| S20 | 13.91 | 3.70 | 1.49 | 81.61 | Twelfth lens |
| S21 | −15.31 | 21.50 | | | |

In Table 13, the interval refers to a linear distance on the optical axis A between two adjacent surfaces. For instance, the interval of the surface S1 refers to the linear distance on the optical axis A between the surface S1 and the surface S2. The thickness, the refraction index, and the abbe number corresponding to each of the lenses listed in the "Notes" columns may be referred to as the corresponding values of the interval, the refraction index, and the abbe number listed in the corresponding rows. In the embodiment, the position of the second lens group 520 in the fixed focal length lens 500 remains unchanged, and the first lens group 510 moves relative to the second lens group 520 to focus. Therefore, the interval of the surface S6 is marked as "variable", which indicated the linear distance on the optical axis between the surface S6 and the surface S7 is variable. According to an embodiment, when a projection distance is relatively short, the interval of the surface S6 is 17.48 mm, for instance; according to another embodiment, when a projection distance is relatively long, the interval of the surface S6 is 17.41 mm, for instance.

Moreover, in Table 13, the surfaces S1 and S2 are two surfaces of the first lens G1, the surfaces S3 and S4 are two surfaces of the second lens G2, the surfaces S5 and S6 are two surfaces of the third lens G3, the surfaces S7 and S8 are two surfaces of the fourth lens G4, the surfaces S9 and S10 are two surfaces of the fifth lens G5, the surfaces S11 and S12 are two surfaces of the sixth lens G6, the surfaces S13 and S14 are two surfaces of the seventh lens G7, the surface S15 is a surface of the eighth lens G8 facing the magnified side, the surface S16 is a surface where the eighth lens G8 is connected to the ninth lens G9, the surface S17 is a surface where the ninth lens G9 is connected to the tenth lens G10, and the surface S18 is a surface of the tenth lens G10 facing the minified side. Here, the surface S18 is also the place where the aperture stop AS is located. The surface S19 is a surface of the eleventh lens G11 facing the magnified side, the surface S20 is a surface where the eleventh lens G11 is connected to the twelfth lens G12, and the surface S21 is surface of the twelfth lens G12 facing the minified side. The numeral values of the parameters, such as the curvature radius and the interval of each surface, are given in Table 13 and thus will not be repeated hereinafter.

The surfaces S1 and S2 of the first lens G1 are aspheric surfaces with even power and may be represented by the following formula:

$$Z = \frac{cy^2}{1+\sqrt{1-(1+K)c^2y^2}} + A_1y^4 + A_2y^6 + A_3y^8 + A_4y^{10} + A_5y^{12} + A_6y^{14}$$

Similarly, in the formula, Z is a sag in the direction of the optical axis A, and c is the inverse of the radius of an osculating sphere, i.e. the inverse of the curvature radii (e.g., the curvature radii of the surfaces S1 and S2 in Table 13) close to the optical axis A. K is a conic coefficient, y is an aspheric height, and $A_1$ to $A_6$ are aspheric coefficients. The parameter values of the surfaces S1 and S2 are listed in Table 14.

TABLE 14

| Aspheric Parameter | Conic Coefficient K | Coefficient $A_1$ | Coefficient $A_2$ | Coefficient $A_3$ | Coefficient $A_4$ | Coefficient $A_5$ | Coefficient $A_6$ |
|---|---|---|---|---|---|---|---|
| S1 | 4.53E+00 | 1.37E−05 | −2.40E−08 | 2.59E−11 | −1.60E−14 | 5.55E−18 | −7.90E−22 |
| S2 | −5.85E−01 | 1.57E−05 | −6.30E−09 | −4.00E−11 | 1.26E−14 | 2.61E−17 | −3.00E−20 |

According to the embodiment, it may be learned that the first lens G1 is an aspheric lens and thus the first lens G1 may effectively resolve coma issues, astigmatism issues, or distortion issues of the fixed focal length lens 500. Besides, in the embodiment, the optimal range of the EFL of the fixed focal length lens 500 is 6.41 mm to 6.47 mm, which should however not be construed as a limitation to the invention. Besides, the numerical aperture (F/#) ranges from 2.79 to 2.91, and the viewing angle (2ω) is greater than 125.5°.

Moreover, the fixed focal length lens 500 described herein satisfies F/H>0.52, where F is an EFL of the fixed focal length lens 500, and H is an image height. The definition of the image height H may be referred to as that depicted in FIG. 2 and thus will not be further described hereinafter. If F/H>1, the viewing angle (2ω) of the fixed focal length lens 500 is less than 90°. At this time, the projection angle is not considered as a wide angle, and thus the imaging quality is not negatively affected even though the first lens G1 described herein is not an aspheric lens. However, if F/H<0.52, the viewing angle (2ω) of the fixed focal length lens 500 is greater than 140°; therefore, more aspheric lenses and other lenses are required to compensate the aberration.

With reference to FIG. 10, in the first lens group 510 described in the embodiment, each of the first lens G1 and the second lens G2 is a convex-concave lens with a convex surface facing the magnified side, and the third lens G3 is a biconcave lens. Each of the second G2 and the third lens G3 is a spherical lens, for instance. Due to the compensation resulting from the aspheric lens in the first lens group 510, at least the distortion issue may be effectively resolved.

According to the embodiment, in the second lens group 520, each of the fourth lens G4, the fifth lens G5, the eighth lens G8, the tenth lens G10, and the twelfth lens G12 is a biconvex lens, each of the sixth lens G6 and the eleventh lens G11 is a convex-concave lens with a convex surface facing the magnified side, the seventh lens G7 is a concave-convex lens with a convex surface facing the magnified side, and the ninth lens G9 is a biconcave lens. In the second lens group 520, the eighth lens G8, the ninth lens G9, and the tenth lens G10 together form a triple cemented lens 522, and the eleventh lens G11 and the twelfth lens G12 together form a double cemented lens 524. Thereby, the spherical aberration issue, the field curvature issue, and the color aberration issue of the fixed focal length lens 500 may be effectively resolved. Moreover, the lenses in the second lens group 520 are all spherical lenses, for instance. Since the twelfth lens G12 is the biconvex lens, the light at the minified side may be effectively collected, and the collected light may pass through the lens and be projected on the magnified side.

To sum up, at least one of the following advantages or effects may be achieved according to the embodiments of the invention. As described above, the lens groups of the fixed focal length lens at most include twelve lenses and at least include nine lenses. Accordingly, compared to the conventional lens, the fixed focal length lens provided herein has the reduced number of lenses and thus has the simplified design. Moreover, the first lens described in the embodiments of the invention is the aspheric lens, which may effectively resolve the distortion issues of the fixed focal length lens. By contrast, all the lenses other than the first lens may be spherical lenses, and thereby the manufacturing costs may be effectively lowered down.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particular exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A fixed focal length lens comprising:
   a first lens group disposed between a magnified side and a minified side, the first lens group having a negative refractive power; and
   a second lens group disposed between the first lens group and the minified side, the second lens group having a positive refractive power,
   wherein the fixed-focus lens satisfies F/H>0.52, F is an effective focal length, and H is an image height, wherein a viewing angle is greater than 116.7 degrees.

2. The fixed focal length lens as recited in claim 1, wherein an effective focal length of the fixed focal length lens is f, an effective focal length of the first lens group is $f_1$, an effective focal length of the second lens group is $f_2$, and the fixed focal length lens satisfies $0.515 < |f_1/f| < 1.299$ and $2.313 < |f_2/f| < 5.724$.

3. The fixed focal length lens as recited in claim 1, wherein an effective focal length of the fixed focal length lens is f, an effective focal length of the first lens group is f, an effective focal length of the second lens group is $f_2$, and the fixed focal length lens satisfies $0.978 < |f/f| < 2.983$ and $2.010 < |f_2/f| < 5.419$.

4. The fixed focal length lens as recited in claim 1, wherein a position of the second lens group in the fixed focal length lens is fixed, and the first lens group moves relative to the second lens group to focus.

5. The fixed focal length lens as recited in claim 1, wherein the second lens group further comprises an aperture stop.

6. The fixed focal length lens as recited in claim 1, wherein the first lens group comprises a first lens, a second lens, and a third lens sequentially arranged from the magnified side to the minified side, a refractive power of the first lens, a refractive power of the second lens, and a refractive power of the third lens are sequentially negative, negative, and negative from the magnified side to the minified side, the first lens is an aspheric lens, the second lens group comprises a fourth lens, a fifth lens, a sixth lens, a seventh lens, an eighth lens, a ninth lens, a tenth lens, an eleventh lens, and a twelfth lens sequentially arranged from the magnified side to the minified side, a refractive power of the fourth lens, a refractive power of the fifth lens, a refractive power of the sixth lens, a refractive power of the seventh lens, a refractive power of the eighth lens, a refractive power of the ninth lens, a refractive power of the tenth lens, a refractive power of the eleventh lens, and a refractive power of the twelfth lens are sequentially positive, positive, negative, positive, positive, negative, positive, negative, and positive from the magnified side to the minified side.

7. The fixed focal length lens as recited in claim 6, wherein each of the first lens, the second lens, the sixth lens, and the eleventh lens is a convex-concave lens with a convex surface facing the magnified side, each of the third lens and the ninth lens is a biconcave lens, each of the fourth lens, the fifth lens, the eighth lens, the tenth lens, and the twelfth lens is a biconvex lens, and the seventh lens is a concave-convex lens with a convex surface facing the magnified side.

8. The fixed focal length lens as recited in claim 6, wherein the eighth lens, the ninth lens, and the tenth lens together form a triple cemented lens, and the eleventh lens and the twelfth lens together form a double cemented lens.

9. The fixed focal length lens as recited in claim 1, wherein the first lens group comprises a first lens, a second lens, a third lens, and a fourth lens sequentially arranged from the magnified side to the minified side, a refractive power of the first lens, a refractive power of the second lens, a refractive power of the third lens, and a refractive power of the fourth lens are sequentially negative, negative, negative, and positive from the magnified side to the minified side, the first lens is an aspheric lens, the second lens group comprises a fifth lens, a sixth lens, a seventh lens, an eighth lens, a ninth lens, and a tenth lens sequentially arranged from the magnified side to the minified side, a refractive power of the fifth lens, a refractive power of the sixth lens, a refractive power of the seventh lens, a refractive power of the eighth lens, a refractive power of the ninth lens, and a refractive power of the tenth lens are sequentially positive, positive, negative, positive, negative, and positive from the magnified side to the minified side.

10. The fixed focal length lens as recited in claim 9, wherein each of the first lens, the second lens, and the ninth lens is a convex-concave lens with a convex surface facing the magnified side, each of the third lens and the seventh lens is a biconcave lens, the fourth lens is a concave-convex lens with a convex surface facing the minified side, and each of the fifth lens, the sixth lens, the eighth lens, and the tenth lens is a biconvex lens.

11. The fixed focal length lens as recited in claim 9, wherein the sixth lens, the seventh lens, and the eighth lens together fat n a triple cemented lens, and the ninth lens and the tenth lens together form a double cemented lens.

12. The fixed focal length lens as recited in claim 1, wherein the first lens group comprises a first lens, a second lens, and a third lens sequentially arranged from the magnified side to the minified side, a refractive power of the first lens, a refractive power of the second lens, and a refractive power of the third lens are sequentially negative, negative, and negative from the magnified side to the minified side, the first lens is an aspheric lens, the second lens group comprises a fourth lens, a fifth lens, a sixth lens, a seventh lens, an eighth lens, and a ninth lens sequentially arranged from the magnified side to the minified side, a refractive power of the fourth lens, a refractive power of the fifth lens, a refractive power of the sixth lens, a refractive power of the seventh lens, a refractive power of the eighth lens, and a refractive power of the ninth lens are sequentially positive, positive, negative, positive, negative, and positive from the magnified side to the minified side.

13. The fixed focal length lens as recited in claim 12, wherein each of the first lens, the second lens, and the eighth lens is a convex-concave lens with a convex surface facing the magnified side, each of the third lens and the sixth lens is a biconcave lens, and each of the fourth lens, the fifth lens, the seventh lens, and the ninth lens is a biconvex lens.

14. The fixed focal length lens as recited in claim 12, wherein the fifth lens, the sixth lens, and the seventh lens together form a triple cemented lens, and the eighth lens and the ninth lens together form a double cemented lens.

15. The fixed focal length lens as recited in claim 1, wherein the first lens group comprises a first lens, a second lens, and a third lens sequentially arranged from the magnified side to the minified side, a refractive power of the first lens, a refractive power of the second lens, and a refractive power of the third lens are sequentially negative, negative, and negative from the magnified side to the minified side, the first lens is an aspheric lens, the second lens group comprises a fourth lens, a fifth lens, a sixth lens, a seventh lens, an eighth lens, a ninth lens, and a tenth lens sequentially arranged from the magnified side to the minified side, a refractive power of the fourth lens, a refractive power of the fifth lens, a refractive power of the sixth lens, a refractive power of the seventh lens, a refractive power of the eighth lens, a refractive power of the ninth lens, and a refractive power of the tenth lens are sequentially positive, positive, positive, negative, positive, negative, and positive from the magnified side to the minified side.

16. The fixed focal length lens as recited in claim 15, wherein each of the first lens, the second lens, and the ninth lens is a convex-concave lens with a convex surface facing the magnified side, each of the third lens and the seventh lens is a biconcave lens, the fourth lens is a concave-convex lens with a convex surface facing the minified side, and each of the fifth lens, the sixth lens, the eighth lens, and the tenth lens is a biconvex lens.

17. The fixed focal length lens as recited in claim 15, wherein the second lens is an aspheric lens.

18. The fixed focal length lens as recited in claim 15, wherein each of the first lens, the second lens, and the ninth lens is a convex-concave lens with a convex surface facing the magnified side, each of the third lens and the seventh lens is a biconcave lens, each of the fourth lens, the fifth lens, the sixth lens, and the tenth lens is a biconvex lens, and the eighth lens is a concave-convex lens with a convex surface facing the magnified side.

19. The fixed focal length lens as recited in claim 15, wherein the tenth lens is an aspheric lens.

20. The fixed focal length lens as recited in claim 15, wherein the sixth lens, the seventh lens, and the eighth lens together form a triple cemented lens, and the ninth lens and the tenth lens together form a double cemented lens.

21. A fixed focal length lens comprising:
a first lens group disposed between a magnified side and a minified side, the first lens group having a negative refractive power; and
a second lens group disposed between the first lens group and the minified side, the second lens group having a positive refractive power,
wherein the fixed-focus lens satisfies $0.627 > F/H > 0.52$, F is an effective focal length, and H is an image height.

* * * * *